(12) United States Patent
Sun et al.

(10) Patent No.: US 11,399,345 B2
(45) Date of Patent: Jul. 26, 2022

(54) POWER CONTROL METHOD, NETWORK DEVICE, AND TERMINAL

(71) Applicant: VIVO MOBILE COMMUNICATION CO., LTD., Guangdong (CN)

(72) Inventors: Xiaodong Sun, Guangdong (CN); Xueming Pan, Guangdong (CN); Peng Sun, Guangdong (CN); Yang Song, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 61 days.

(21) Appl. No.: 16/646,186

(22) PCT Filed: Aug. 21, 2018

(86) PCT No.: PCT/CN2018/101493
§ 371 (c)(1),
(2) Date: Mar. 11, 2020

(87) PCT Pub. No.: WO2019/047711
PCT Pub. Date: Mar. 14, 2019

(65) Prior Publication Data
US 2020/0275379 A1  Aug. 27, 2020

(30) Foreign Application Priority Data
Sep. 11, 2017  (CN) .......................... 201710813624.9

(51) Int. Cl.
*H04W 52/32* (2009.01)
*H04W 52/14* (2009.01)
(Continued)

(52) U.S. Cl.
CPC ........ *H04W 52/146* (2013.01); *H04B 7/0626* (2013.01); *H04L 27/2613* (2013.01);
(Continued)

(58) Field of Classification Search
CPC .......... H04W 72/046; H04W 72/0413; H04W 52/146; H04W 52/242; H04W 52/08;
(Continued)

(56) References Cited

U.S. PATENT DOCUMENTS

2014/0036809 A1  2/2014  Xu et al.
2015/0110023 A1  4/2015  Pan
(Continued)

FOREIGN PATENT DOCUMENTS

CN  104518845 A  4/2015
CN  102427608 A  7/2015
(Continued)

OTHER PUBLICATIONS

First Office Action dated Dec. 30, 2020 issued in Chinese Application No. 2017108136249.
(Continued)

*Primary Examiner* — Tu X Nguyen
(74) *Attorney, Agent, or Firm* — Brooks Kushman P.C.

(57) ABSTRACT

A power control method, a network device, and a terminal are provided. The power control method includes configuring a power control parameter for a resource in an uplink beam management resource set used for an uplink beam management procedure; and sending the power control parameter to a terminal, so that the terminal sends the resource in the uplink beam management resource set according to the power control parameter.

20 Claims, 7 Drawing Sheets

(51) Int. Cl.
    *H04B 7/06* (2006.01)
    *H04L 27/26* (2006.01)
    *H04W 52/10* (2009.01)
    *H04W 52/24* (2009.01)
    *H04W 52/36* (2009.01)
    *H04W 74/00* (2009.01)
    *H04W 74/08* (2009.01)

(52) U.S. Cl.
    CPC ......... *H04W 52/10* (2013.01); *H04W 52/242* (2013.01); *H04W 52/367* (2013.01); *H04W 74/004* (2013.01); *H04W 74/0833* (2013.01)

(58) Field of Classification Search
    CPC ... H04W 52/10; H04W 52/04; H04W 52/143; H04W 52/221; H04W 52/265; H04W 52/32; H04W 76/27; H04W 52/18; H04W 72/14; H04W 52/38; H04W 52/06; H04B 7/0695; H04B 7/088; H04B 7/0452
    See application file for complete search history.

(56) References Cited

U.S. PATENT DOCUMENTS

| | | | |
|---|---|---|---|
| 2016/0080060 | A1 | 3/2016 | Yu |
| 2016/0219534 | A1 | 7/2016 | Hao |
| 2017/0033908 | A1 | 2/2017 | Hwang et al. |
| 2017/0064686 | A1 | 3/2017 | Li |
| 2019/0074882 | A1* | 3/2019 | Zhou ............... H04W 72/0406 |
| 2019/0199496 | A1 | 6/2019 | Qin et al. |
| 2019/0223117 | A1 | 7/2019 | Chai et al. |
| 2019/0349868 | A1 | 11/2019 | Zhang et al. |

FOREIGN PATENT DOCUMENTS

| | | |
|---|---|---|
| CN | 106255207 A | 12/2016 |
| CN | 106576253 A | 4/2017 |
| CN | 107889209 A | 4/2018 |
| CN | 108024365 A | 5/2018 |
| CN | 104767586 A | 6/2018 |
| CN | 108134659 A | 6/2018 |
| CN | 108365930 A | 8/2018 |
| CN | 104620645 A | 11/2018 |
| CN | 106233658 A | 7/2019 |
| WO | 2017003327 A | 1/2017 |

OTHER PUBLICATIONS

3GPP TSG RAN WG1 Meeting #89, R1-1707728, Hangzhou, China, May 15-19, 2017, "Discussion on uplink power control", 2 pages.
3GPP TSG RAN WG1 NR Ad Hoc Meeting, RI-1710459, Qingdao, China, Jun. 27-30, 2017, "Discussion on UL SRS transmission power", 4 pages.
3GPP TSG RAN WG1 Meeting #90, R1-1713973, Prague, Czech Republic, Aug. 21-25, 2017, "Power control framework for PUSCH", 3 pages.
Extended European Search Report dated Sep. 24, 2020 issued in PCT/CN2018/101493.
3GPP ISG RAN Wc1 Meeting #90, R1-1713973, Prague, Czech Republic, Aug. 21-25, 2017, Power control framework for PUSCH; 3 pages.
3GPP TSG RAN WGI Meeting #90, RI-1714170, Prague, Czech Republic, Aug. 21-25, 2017, Common and Beam Specific Power Control Parameters; 5 pages.
International Preliminary Report on Patentability dated Mar. 26, 2020 and Written Opinion dated Nov. 1, 2018 both issued in International Application No. PCT/CN2018/101493.
International Search Report dated Apr. 13, 2020 issued in Chinese Application No. 201710813624.9.

\* cited by examiner

11,399,345 B2

POWER CONTROL METHOD, NETWORK DEVICE, AND TERMINAL

CROSS-REFERENCE TO RELATED APPLICATION

This application is the U.S. national phase of PCT Application No. PCT/CN2018/101493 filed on Aug. 21, 2018, which claims a priority to Chinese Patent Application No. 201710813624.9 filed in China on Sep. 11, 2017, the disclosures of which are incorporated in their entirety by reference herein.

TECHNICAL FIELD

The embodiments of the present disclosure relate to the field of communication technology, and more particularly, relates to a power control method, a network device, and a terminal.

BACKGROUND

In a conventional fourth generation (4G) mobile communication system, a Sounding Reference Signal (SRS) is mainly used for acquiring uplink or downlink Channel State Information (CSI). However, in future mobile communication system, for example, a mobile communication system based on a fifth generation (5G) mobile communication technology, an SRS can be used not only for acquiring uplink or downlink CSI, but also be used for beam management. However, in the related art, there is no related solution for how to perform power control of resources for uplink beam management.

SUMMARY

In a first aspect, some embodiments of the present disclosure provide a power control method. The method is used for a network device, the method includes: configuring a power control parameter for a resource in an uplink beam management resource set used for an uplink beam management procedure; and sending the power control parameter to a terminal, so that the terminal sends the resource in the uplink beam management resource set according to the power control parameter.

In a second aspect, some embodiments of the present disclosure also provide a power control method. The method is used for a terminal, the method includes: receiving a power control parameter corresponding to a resource in an uplink beam management resource set used for an uplink beam management procedure; and sending the resource in the uplink beam management resource set according to the power control parameter corresponding to the resource in the uplink beam management resource set.

In a third aspect, some embodiments of the present disclosure also provide a network device. The network device includes: a first configuration module, used to configure a power control parameter for a resource in an uplink beam management resource set used for an uplink beam management procedure; and a sending module, used to send the power control parameter to a terminal, so that the terminal sends the resource in the uplink beam management resource set according to the power control parameter.

In a fourth aspect, some embodiments of the present disclosure also provide a terminal. The terminal includes: a first reception module, used to receive a power control parameter corresponding to a resource in an uplink beam management resource set used for an uplink beam management procedure; and a sending module, used to send the resource in the uplink beam management resource set according to the power control parameter corresponding to the resource in the uplink beam management resource set.

In a fifth aspect, some embodiments of the present disclosure also provide a network device. The network device includes a storage, a processor, and a computer program stored on the storage and executable by the processor, wherein, when the processor executes the computer program, the processor implements the steps of the power control method according to the above first aspect.

In a sixth aspect, some embodiments of the present disclosure also provide a terminal. The terminal includes a storage, a processor, and a computer program stored on the storage and executable by the processor, wherein, when the processor executes the computer program, the processor implements the steps of the power control method according to the above second aspect.

In a seventh aspect, some embodiments of the present disclosure also provide a computer readable storage medium, wherein a computer program is stored on the computer readable storage medium, and when a processor executes the computer program, the processor implements the steps of the power control method according to the first aspect.

In an eighth aspect, some embodiments of the present disclosure also provide a computer readable storage medium, wherein a computer program is stored on the computer readable storage medium, and when a processor executes the computer program, the processor implements the steps of the power control method according to the second aspect.

BRIEF DESCRIPTION OF THE DRAWINGS

In order to more clearly illustrate the technical solution of the embodiments of the present disclosure, accompany drawings to be used in description of the embodiments of the present disclosure will be briefly introduced below, and it will be apparent that the accompanying drawings in the following description are only some embodiments of the present disclosure, and for those of ordinary skill in the art, other drawings may also be obtained from these drawings without creative labor.

DETAILED DESCRIPTION

Figure 1:
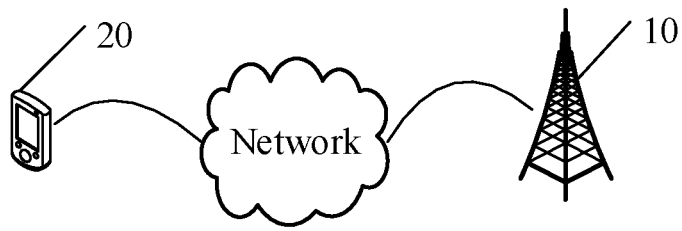
FIG. 1 is a schematic diagram of a network structure to which a power control method provided by some embodiments of the present disclosure can be applied.

Technical solutions in the embodiments of the present disclosure will be clearly and completely described hereinafter in conjunction with the drawings in the embodiments of the present disclosure, and it will be apparent that the described embodiments are only some, rather than all, of the embodiments of the present disclosure. Based on the embodiments of the present disclosure, all other embodiments obtained by those of ordinary skill in the art without creative work are within the protection scope of the present disclosure.

Such terms as "first", "second", and so on, in the specification and claims of the present disclosure are used to distinguish between similar objects and need not be used to describe a particular order or sequence. It should be understood that the terms used in such as way may be interchanged where appropriate in order to implement the embodiments of the present application described herein, such as in a sequence other than those illustrated or described herein. In addition, such terms as "include" and "have" and any variation thereof, are intended to cover a non-exclusive inclusion, for example, non-exclusive inclusion of s series of processes, methods, systems, products including a series of steps or units, without needing to be limited to those steps or units clearly listed, but may include other steps or units not clearly listed or inherent to these processes, methods, products or devices. In addition, usage of "and/or" in the specification and claim means at least one of objects connected by the "and/or", such as A and/or B and/or C means seven cases including only A, only B, only C, both A and B, both B and C, both A and C, all of A, B and C.

In a conventional mobile communication system based on fourth generation (4G) mobile communication technology, a Sounding Reference Signal (SRS) is mainly used for acquiring uplink or downlink Channel State Information (CSI). Specifically, a power at which a terminal, for example, a User Equipment (UE) sends an SRS on a subframe i is:

$$P_{SRS}(i) = \min\{P_{CMAX}, P_{SRS\_OFFSET} + 10 \log_{10}(M_{SRS}) + P_{O\_PUSCH}(j) + \alpha(j) \cdot PL + f(i)\}$$

where $P_{CMAX}$ represents the maximum transmission power configured by the UE; $P_{SRS\_OFFSET}$ represents a semi-static parameter of the UE configured by a higher layer, which is divided into two cases, in a case that $K_S=1.25$, then a range of $P_{SRS\_OFFSET}$ is [−3, 12] db and a step size is 1 db; in a case that $K_S=0$, then the range of $P_{SRS\_OFFSET}$ is [−10.5, 12] and the step size is 1.5 db; $M_{SRS}$ represents a transmission bandwidth of the SRS, which is expressed by the number of resource blocks (RBs); f(i) represents a current power adjustment value of a Physical Uplink Sharing Channel (PUSCH); both $P_{O\_PUSCH}(j)$ and $\alpha(j)$ are values related to the PUSCH, j=1; PL represents a value of the path loss.

In a future mobile communication system, for example, a mobile communication system based on a fifth generation (5G) mobile communication technology, an SRS can be used not only for acquiring uplink or downlink CSI, but also be used for beam management. However, in the related art, there is no related solution for how to perform power control of resources for uplink beam management.

Specifically, in some embodiments of the present disclosure, uplink power control relates to the following: in a New Radio (NR) system, a Physical Uplink Sharing Channel (PUSCH) and a part of all types of Sounding Reference Signal (SRS) share the same closed-loop power control command; PUSCH and Physical Uplink Control Channel (PUCCH) rely on independent power control commands; power control of an inter-carrier handover of the SRS; calculation of a path loss (i.e., Path Loss) supports at least a periodic Channel State Information Reference Signal (CSI-RS) calculation, and is applicable to PUSCH, PUCCH, and SRS.

Specifically, the SRS may be used not only for acquiring uplink or downlink Channel State Information (CSI), but also for beam management. In order to facilitate a network device (e.g., a base station) to better evaluate a quality (superior or inferior) of an uplink beam of a terminal, such as a User Equipment (UE), transmission powers of uplink beam management resources used for an uplink beam management procedure is preferably the same in the uplink beam measurement process when an SRS or another resource (e.g., a resource of a physical uplink shared channel) is used for uplink beam management). Accordingly, the embodiments of the present disclosure provide a power control method of an uplink beam management resource in an uplink beam management procedure so as to regulate power control of the uplink beam management resource in the uplink beam management procedure, further improve an efficiency of uplink beam management and improve an uplink transmission speed.

Referring to FIG. 1, FIG. 1 is a schematic diagram of a network structure to which some embodiments of the present disclosure are applicable, and as shown in FIG. 1, the network structure includes a network device 10 and a terminal 20, wherein the terminal 20 can communicate with the network device 10 through a network. The network device 10 may be an Evolutional base station (an Evolutional Node B, or eNB or eNodeB for short), a relay station or an access point, or a base station in a 5G network (gNB), or a radio network controller on a network side or a terminal (simply referred to as a UE), which is not limited herein. The terminal 20 may be a mobile phone, a Tablet Personal Computer, a Laptop Computer, a Personal Digital Assistant (PDA), a Mobile Internet Device (MID) or a Wearable Device or the like.

In the embodiments of the present disclosure, the network device 10 configures a power control parameter for a resource in an uplink beam management resource set used for an uplink beam management procedure, and sends the power control parameter to the terminal 20. The uplink beam management includes a plurality of identical or different beam transmission resources being adopted by the terminal.

The resource set may include one or more of an SRS resource set, a Physical Random Access Channel (PRACH) resource set and a Physical Uplink Control Channel (PUCCH) resource set, each of one or more of the SRS resource set, the PRACH resource set, and the PUCCH resource set includes resources corresponding to the same resource identifier and/or resources corresponding to different resource identifiers.

The above power control parameter may include one or more of an open-loop power control parameter set, a closed-loop power control parameter set, and a transmission power, wherein the open-loop power control parameter set may include, but is not limited to, one or more of a target reception power, a path loss compensation factor, and a power offset. The closed-loop power control parameter set may include, but is not limited to, one or more of a power adjustment value, the number of resource blocks, and a modulation and coding scheme.

Optionally, the network device 10 may configure the common power control parameter for the same resource or different resources in the same uplink beam management resource set used for the uplink beam management procedure, so that the terminal 20 sends the resources in the uplink beam management resource set using the same transmission power in the uplink beam management procedure.

Optionally, the network device 10 may send the above-described power control parameter to the terminal 20 through a higher-layer (i.e., Higher Layer) signaling.

After the terminal receives the power control parameter sent by the network device 10, the terminal 20 may send the resources in the uplink beam management resource set according to the power control parameter. For example, in a case that the power control parameter is the transmission power, the terminal 20 may send the resources in the uplink beam management resource set using the transmission power. In a case that the power control parameter is a path loss value, the terminal 20 may calculate a transmission power using the path loss value, and further send resources in the uplink beam management resource set using the transmission power. In a case that the power control parameter is a reference beam set, the terminal 20 may calculate a path loss value using the reference beam set, and further calculate a transmission power, and further send the resources in the uplink beam management resource set using the transmission power. In a case that the power control parameter is the open-loop power control parameter set and/or the closed-loop power control parameter set, the terminal 20 may calculate a transmission power according to the open-loop power control parameter set and/or the closed-loop power control parameter set, and further send the resources in the uplink beam management resource set using the transmission power.

Optionally, in some embodiments of the present disclosure, in a case that the power control parameters for the resources in the uplink beam management resource set used for the uplink beam management procedure are the same, the terminal 20 may send respective resources in the uplink beam management resource set used for the uplink beam management procedure using the same transmission power, so that the network device (e.g., the base station) may better evaluate the quality of an uplink beam.

In this way, in some embodiments of the present disclosure, the network device 10 configures the power control parameter for the uplink beam management resource set, and sends the power control parameter to the terminal 20. Thus, the terminal 20 may send the resource used for the uplink beam management based on the power control parameter configured by the network side, and may control a signaling overhead of the power control of the uplink beam management resources used for the uplink beam management procedure.

Figure 2:
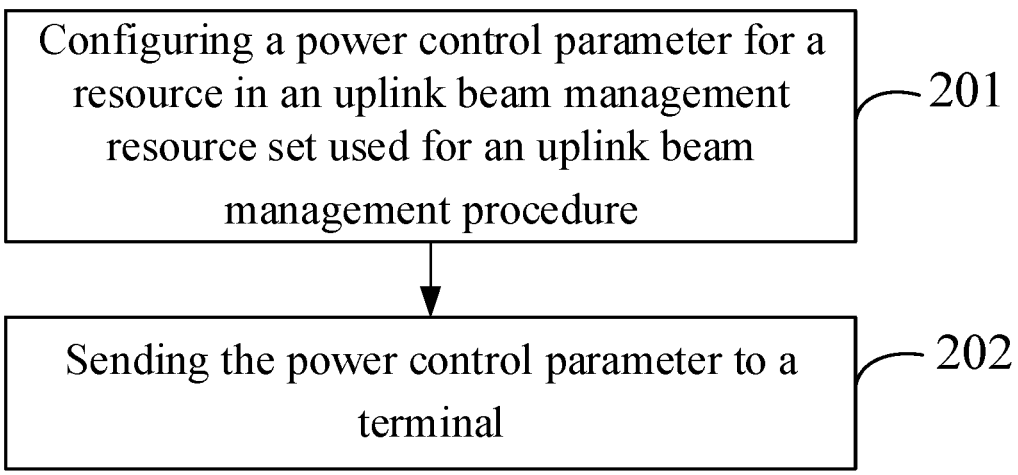
FIG. 2 is a flowchart of a power control method provided by some embodiments of the present disclosure.

The embodiments of the present disclosure provide a power control method. The method is applied to a network device. Referring to FIG. 2, FIG. 2 is a flowchart of a power control method provided by some embodiments of the present disclosure, and as shown in FIG. 2, the method includes the following steps 201-202.

Step 201: configuring a power control parameter for a resource in an uplink beam management resource set used for an uplink beam management procedure.

In some embodiments of the present disclosure, the uplink beam management procedure may include an identical beam or a plurality of different beams being adopted by a user equipment.

The uplink beam management resource set may include one or more of an SRS resource set, a PRACH resource set, and a PUCCH resource set, wherein the SRS resource set may include one or more SRS resources, the PRACH resource set may include one or more PRACH resources and the PUCCH resource set may include one or more PUCCH resources.

Optionally, each of one or more of the SRS resource set, the PRACH resource set, and the PUCCH resource set may include resources corresponding to the same resource identifier and/or resources corresponding to different resource identifiers, wherein, resources corresponding to the same resource identifier are the same, and resources corresponding to different resource identifiers are different. For example, in a case that the uplink beam management resource set includes the SRS resource set and the PRACH resource set, the SRS resource set may include SRS resources corresponding to the same resource identifier and/or SRS resources corresponding to different resource identifiers. Similarly, the PRACH resource set may also include PRACH resources corresponding to the same resource identifier and/or PRACH resources corresponding to different resource identifiers.

Optionally, the above power control parameter is used for power control of resources in the uplink beam management resource set. For example, the above power control parameter may include, but is not limited to, one or more of the open-loop power control parameter set, the closed-loop power control parameter set and the transmission power.

Optionally, the open-loop power control parameter set may include, but is not limited to, one or more of a target reception power, a path loss compensation factor, and a power offset; the closed-loop power control parameter set may include, but is not limited to, one or more of a power adjustment value, the number of resource blocks, and a modulation and coding scheme.

It will be understood that the embodiments of the present disclosure may reasonably configure the above-described power control parameter according to actual conditions.

It will be understood that the embodiments of the present disclosure may configure only one power control parameter for all resources in the uplink beam management resource set in the uplink beam management procedure, and may also configure a power control parameter for each resource in the uplink beam management resource set in the uplink beam management procedure.

Step 202: sending the power control parameter to the terminal, so that the terminal sends a resource in the uplink beam management resource set according to the power control parameter.

In some embodiments of the present disclosure, the network device sends, to a terminal, the power control parameter configured for the resources in the uplink beam management resource set used for the uplink beam management procedure. Thus, the terminal may send, according to the power control parameters configured by the network device, the resources in the uplink beam management resource set used for the uplink beam management procedure. For example, in a case that the power control parameter is the transmission power, the terminal may send the resources in the uplink beam management resource set using the transmission power; in a case that the power control parameter is the path loss value, the terminal may calculate a transmission power according to the path loss value, and further send the resources in the uplink beam management resource set using the transmission power; in a case that the power control parameter is a reference beam set identifier, the terminal may calculate a path loss value according to the reference beam set identifier, further calculate a transmission power, and further send the resources in the uplink beam management resource set using the transmission power, wherein the reference beam set may include one or more reference beam identifiers; in a case that the power control parameter is the open-loop power control parameter set and/or the closed-loop power control parameter set, the terminal may calculate a transmission power according to the open-loop power control parameter set and/or the closed-loop power control parameter set, and further send the resources in the uplink beam management resource set using the transmission power.

Thus, the power control method according to some embodiments of the present disclosure configures the power control parameter for the resources in the uplink beam management resource set used for the uplink beam management procedure, and sends the power control parameter to the terminal, such that the terminal sends the resources in the uplink beam management resource set according to the power control parameter. In this way, power control of the resources in the uplink beam management resource set used for the uplink beam management procedure is realized, and the signaling overhead of the power control of an uplink beam management resource used for the uplink beam management procedure can be controlled.

Optionally, the uplink beam management resource set includes one or more of a Sounding Reference Signal (SRS) resource set, a Physical Random Access Channel (PRACH) resource set, and a Physical Uplink Control Channel (PUCCH) resource set, wherein, each of one or more of the SRS resource set, the PRACH resource set, and the PUCCH resource set includes resources corresponding to the same resource identifier and/or resources different resource identifiers.

The power control parameter includes one or more of an open-loop power control parameter set, a closed-loop power control parameter set, a transmission power, a path loss value, and a reference beam set identifier.

In some embodiments of the present disclosure, the SRS resource set may include one or more SRS resources. The PRACH resource set may include one or more PRACH resources. The PUCCH resource set may include one or more PUCCH resources. Each of the above SRS resource set, the PRACH resource set, and the PUCCH resource set may include the same resource and/or different resources. For example, the PRACH resource set may include PRACH resources having the same channel type and the same beam, and/or PRACH resources having different channel types or PRACH resources having the same channel type but different beams. In particular, the embodiments of the present disclosure may identify the same resource and different resources according to a resource identifier, and accordingly, each of the above SRS resource set, the PRACH resource set and the PUCCH resource set may include resources corresponding to the same resource identifier and/or resources different resource identifiers.

The reference beam set identifier described above may include one or more reference beam identifiers.

The power control parameter described above may include, but is not limited to, one or more of an open-loop power control parameter set, a closed-loop power control parameter set, and a transmission power, wherein the open-loop power control parameter set may include one or more open-loop power control parameters, such as a target reception power, a path loss compensation factor, and so on; the closed-loop power control parameter set may include one or more closed-loop power control parameters, for example, a power adjustment value, the number of resource blocks, and the like. It will be understood that the embodiments of the present disclosure may reasonably configure the above-described power control parameter according to actual conditions.

Optionally, the open-loop power control parameter set includes one or more of a target reception power, a path loss compensation factor, and a power offset; and the closed-loop power control parameter set includes one or more of a power adjustment value, the number of resource blocks, and a modulation and coding scheme.

In some embodiments of the present disclosure, the open-loop power control parameter set may include, but is not limited to, one or more of a target reception power, a path loss compensation factor, a power offset; the closed-loop power control parameter set may include, but is not limited to, one or more of a power adjustment value, the number of resource blocks, a modulation and coding scheme.

It may be understood that the embodiments of the present disclosure may reasonably configure the open-loop power control parameter set and the closed-loop power control parameter set as described above according to actual conditions.

Optionally, the above step 201 of configuring the power control parameter for the resource in the uplink beam management resource set used for the uplink beam management procedure, includes: configuring the common power control parameter for resources in the uplink beam management resource set used for the uplink beam management procedure; or configuring a corresponding power control parameter for each resource in the uplink beam management resource set used for the uplink beam management procedure, respectively, wherein corresponding power control parameters for respective resources are the same.

In the embodiments of the present disclosure, only one power control parameter may be configured for all resources in the beam management resource set used for the uplink beam management procedure. That is, all resources in the uplink beam management resource set used for the uplink beam management procedure correspond to the common power control parameter, so that the terminal sends all resources in the beam management resource set according to the common power control parameter. Optionally, the embodiments of the present disclosure may also configure one power control parameter for respective resource in the beam management resource set used for the uplink beam management procedure. That is, each resource in the beam management resource set used for the uplink beam management procedure corresponds to one power control parameter, so that the terminal can control sending of each resource according to the power control parameter corresponding to the each resource. It should be noted that, in order for the network device to better evaluate the quality of the uplink beam of the terminal, power control parameters corresponding to respective resources are the same, so that the terminal can send each resource with the same transmission power.

Optionally, the open-loop power control parameter set and/or the closed-loop power control parameter set are determined by a downlink beam or a downlink beam pair used to calculate a path loss value of a resource in the uplink beam management resource set, or, determined by an uplink beam or an uplink beam pair corresponding to the downlink beam or the downlink beam pair used to calculate a path loss value of a resource in the uplink beam management resource set; or the open-loop power control parameter set and/or the closed-loop power control parameter set are determined based on a reference power control parameter, wherein, the reference power control parameter includes a power control parameter of a Physical Uplink Shared Channel (PUSCH) or a power control parameter of a Physical Random Access Channel (PRACH) or a power control parameter of a Physical Uplink Control Channel (PUCCH) or a power control parameter of a Sounding Reference Signal (SRS); and/or the path loss value is calculated from one or more Reference Signal Receiving Power (RSRP) values reported by the terminal based on a channel state information reference signal (CSI-RS) set and/or a synchronization signal block set; and/or the reference beam set identifier is determined based on a beam reported by a terminal.

The synchronization signal block set may be, for example, a Synchronization Signal (SS) block (i.e., Block) in a 5G system. It may be understood that the above synchronization signal block set may also be synchronization signal blocks in other mobile communication systems. The RSRP may be a first-layer RSRP (L1-RSRP), or a third-layer RSRP (L3-RSRP).

In some embodiments of the present disclosure, the open-loop power control parameter set and/or the closed-loop power control parameter set may be determined based on a downlink beam or a downlink beam pair used to calculate a path loss value of a resource in the uplink beam management resource set, or, determined based on an uplink beam or an uplink beam pair corresponding to the downlink beam or the downlink beam pair used to calculate a path loss value of a resource in the uplink beam management resource set.

In particular, the terminal may calculate the path loss value based on a periodic or semi-persistent Channel State Information Reference Signal (CSI-RS) set and/or synchronization signal block set, wherein the CSI-RS set may include one or more CSI-RSs, the synchronization signal block set may include one or more synchronization signal blocks. It should be noted that the above periodic CSI-RS set and/or synchronization signal block set may refer to a set of periodically sent CSI-RSs and/or a set of periodically sent synchronization signal blocks. The semi-persistent CSI-RS set and/or synchronization signal block set described above may refer to a set of CSI-RSs periodically sent within a time period (e.g., which may be determined by a configured start time point and a configured end time point), and/or a set of synchronization signal blocks periodically sent over a time period.

For example, the terminal may take the maximum of the path loss values of transmission beams or transmission beam pairs of at least two CSI-RSs and/or at least two synchronization signal blocks as the path loss value corresponding to the resource in the uplink beam management resource set; or take the minimum of the path loss values of transmission beams or transmission beam pairs of at least two CSI-RSs and/or at least two synchronization signal blocks as the path loss value corresponding to the resource in the uplink beam management resource set; or take an intermediate value among the path loss values of transmission beams or transmission beam pairs of at least two CSI-RSs and/or at least two synchronization signal blocks as the path loss value corresponding to the resource in the uplink beam management resource set; or take a weighted average value of the path loss values of transmission beams or transmission beam pairs of at least two CSI-RSs and/or at least two synchronization signal blocks as the path loss value corresponding to the resource in the uplink beam management resource set.

For example, taking as an example a case that the maximum value between the path loss value "a" of the transmission beam or the transmission beam pair for a CSI-RS having an identifier "a" and the path loss value "b" of the transmission beam or the transmission beam pair for a CSI-RS having an identifier "b" is taken as the path loss value corresponding to the resource in the uplink beam management resource set; in a case that the path loss value "a" is greater than the path loss value "b", the path loss value corresponding to the resource in the uplink beam management resource set is the path loss value "a", and the open-loop power control parameter set and/or the closed-loop power control parameter set described above may be determined based on the downlink beam or the downlink beam pair used to calculate the path loss value "a", i.e., the transmission beam or the transmission beam pair for the CSI-RS having the identifier "a", or based on the uplink beam or the uplink beam pair corresponding to the transmission beam or the transmission beam pair for the CSI-RS having the identifier "a".

Optionally, the open-loop power control parameter set and/or the closed-loop power control parameter set may also be determined based on the reference power control parameter, wherein, the reference power control parameter includes a power control parameter of the Physical Uplink Shared Channel (PUSCH) or a power control parameter of the Physical Random Access Channel (PRACH) or a power control parameter of the Physical Uplink Control Channel (PUCCH) or a power control parameter of the Sounding Reference Signal (SRS).

Optionally, the open-loop power control parameter set and/or the closed-loop power control parameter set may be configured by referring to the power control parameter of the PUSCH currently or historically sent, or referring to the power control parameter of the PRACH currently or historically sent, or referring to the power control parameter of the SRS currently or historically sent. In particular, the open-loop power control parameter set and/or the closed-loop power control parameter set may be configured by referring to the power control parameter of the PUSCH most recently sent, or referring to the power control parameter of the PRACH most recently sent, or referring to the power control parameter of the SRS most recently sent.

For example, in a case that the open-loop power control parameter set includes the target reception power, a target reception power "a" of the PUSCH most recently sent may be used as the target reception power in the open-loop power control parameter set.

Optionally, the path loss value may be calculated according to one or more Reference Signal Receiving Power (RSRP) values reported by the terminal based on the channel state information reference signal (CSI-RS) set and/or the synchronization signal block set.

In the embodiments of the present disclosure, the network device may calculate the path loss value according to the one or more Reference Signal Receiving Power (RSRP) reported by the terminal based on the CSI-RS set and/or the synchronization signal block set, and send the path loss value to the terminal, so that the terminal calculates a transmission power according to the path loss value. It may be understood that the above CSI-RS set and/or the synchronization signal block set may be configured by the network device for the terminal, or may be configured by the terminal.

Optionally, the above step 201 of configuring the power control parameter for the resource in the uplink beam management resource set used for the uplink beam management procedure includes: configuring a part of power control parameters in the open-loop power control parameter set and/or a part of power control parameters in the closed-loop power control parameter set for resources in the uplink beam management resource set used for the uplink beam management procedure.

In the embodiments of the present disclosure, a part of power control parameters in the open-loop power control parameter set and/or a part of power control parameters in the closed-loop power control parameter set may also be configured for the resource in the uplink beam management resource set used for the uplink beam management procedure. Optionally, a part of the power control parameters in the open-loop power control parameter set and/or a part of the closed-loop power control parameter set may be configured in conjunction with a power control parameter configured by a terminal side, e.g., in a case that the terminal side configures the target reception power, the network device side may configure one or more of remaining power control parameters other than the target reception power, for example, the path loss compensation factor, the power offset, and the like.

Specifically, the network device sends a part of power control parameters in the open-loop power control parameter set and/or a part of power control parameters in the closed-loop power control parameter set to the terminal, so that the terminal may calculate a transmission power based on the part of the power control parameters in the open-loop power control parameter set and/or the part of the power control parameters in the closed-loop power control parameter set configured by the network device, in conjunction with the power control parameter configured by the terminal side, so that the transmission power can be used to send resource in the resource set.

Optionally, configuration of the power control parameter at the terminal side may be performed by referring to the power control parameter of the PUSCH most recently sent or the power control parameter of the PRACH most recently sent or the power control parameter of the PUCCH most recently sent or the power control parameter of the SRS most recently sent. For example, in a case that the terminal side needs to configure the target reception power of the resources of the resource sets, the target reception power of the PUSCH most recently sent may be used as the target reception power of the resources of the resource sets.

The embodiments of the present disclosure configure a part of power control parameters in the open-loop power control parameter set and/or a part of power control parameters in the closed-loop power control parameter set only for the resource in the uplink beam management resource set used for the uplink beam management procedure, and may reduce a control signaling overhead.

Optionally, the method further includes: configuring a channel state information reference signal (CSI-RS) set or a synchronization signal block set for calculating a path loss value of the resource in the uplink beam management resource set, and sending the CSI-RS set or the synchronization signal block set to the terminal; or configuring a measurement resource set and sending the measurement resource set to the terminal.

In some embodiments of the present disclosure, the network device may configure a channel state information reference signal (CSI-RS) set or a synchronization signal block set for calculating a path loss value of the resource in the uplink beam management resource set, and send the channel state information reference signal (CSI-RS) set or the synchronization signal block set to the terminal, so that the terminal may calculate the path loss value of the resource in the resource set based on the CSI-RS set or the synchronization signal block set sent by the network device, wherein the CSI-RS set may include one or more CSI-RS, and the synchronization signal block set described above may include one or more synchronization signal blocks.

Optionally, the network device in some embodiments of the present disclosure may also configure a measurement resource set and send the measurement resource set to the terminal, wherein the measurement resource set includes a plurality of measurement resources, and the plurality of measurement resources may be CSI-RSs or synchronization signal blocks.

Optionally, the terminal determines the CSI-RS set or the synchronization signal block set used to calculate the path loss value of the resource in the uplink beam measurement resource set, according to a Reference Signal Receiving Power (RSRP) or a Signal to Interference Plus Noise Ratio (SINR) of each measurement resource. For example, N measurement resources with relatively larger RSRPs or relatively larger SINRs may be obtained from M measurement resources and taken as a CSI-RS set or a synchronization signal block set for calculating path loss value of the resource in the uplink beam management resource set, where M, N are all positive integers, M>=N.

It may be understood that, in the embodiments of the present disclosure a CSI-RS set or a synchronization signal block set described above for calculating the path loss value of the resource in the uplink beam management resource set may also be predefined in a protocol (Technical Specification or Technical Protocol).

Optionally, in a case that the power control parameter is the transmission power, the step 201 of configuring the power control parameter for the resource in the uplink beam management resource set used for an uplink beam management procedure, includes: receiving a Reference Signal Receiving Power (RSRP) reported by the terminal based on periodic or semi-persistent channel state information reference signals or synchronization signal blocks; and calculating the transmission power according to the RSRP.

In some embodiments of the present disclosure, the network device may directly configure the transmission power for the resource in the uplink beam management resource set used for the uplink beam management procedure, for example, the transmission power may be calculated according to the RSRP reported by the terminal based on the periodic or semi-persistent channel state information reference signals or synchronization signal blocks. Thus, the terminal can directly send the resource in the uplink beam management resource set using the transmission power.

It should be noted that the above periodic CSI-RS set and/or synchronization signal block set may be a set of CSI-RSs periodically sent and/or a set of synchronization signal blocks periodically sent. The semi-persistent CSI-RS set and/or synchronization signal block set described above may be a set of CSI-RSs periodically sent within a time period (e.g., which may be determined by a configured start time point and a configured end time point), and/or a set of synchronization signal blocks periodically sent over a time period. The above RSRP may include an L3-RSRP or an L1-RSRP.

In some embodiments of the present disclosure, the transmission power is configured for the uplink beam management resource used for the uplink beam management procedure by the network side, so that a control signaling overhead can be effectively reduced.

Optionally, the above step 201 of configuring the power control parameter for the resource in the uplink beam management resource set used for the uplink beam management procedure, includes: configuring different power control parameters for resources in uplink beam management resource sets used for different uplink beam management procedures; configuring different power control parameters for resources in non-quasi-colocation resource subsets of the uplink beam management resource set used for one uplink beam management procedure.

In some embodiments of the present disclosure, different power control parameters may be configured for resources in uplink beam management resource sets used for different uplink beam management procedures. For example, a power control parameter "a" is configured for the resource in the uplink beam management resource set used for an uplink beam management procedure "a", a power control parameter "b" is configured for the resources in the uplink beam management resource set used for the uplink beam management procedure "b", where the power control parameter "a" and the power control parameter "b" are different.

Optionally, the embodiments of the present disclosure may configure different power control parameters for non-quasi-colocation resources in the uplink beam management resource set used for one uplink beam management procedure.

The embodiments of the present disclosure configure different power control parameters for resources in uplink beam management resource sets used for different uplink beam management procedures, and configure different power control parameters for resources in the non-quasi-colocation resource subsets of the uplink beam management resource set used for one uplink beam management procedure, to improve an accuracy of power control.

Figure 3:
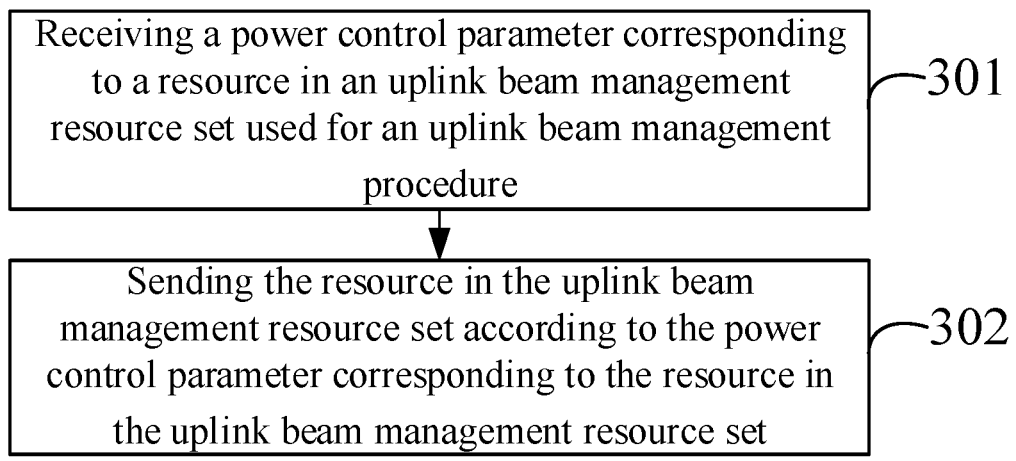
FIG. 3 is a flowchart of a power control method provided by another embodiment of the present disclosure.

Referring to FIG. 3, FIG. 3 is a flowchart of a power control method provided by another embodiment of the present disclosure. The method is applied to a network side. As shown in FIG. 3, the present disclosure provides a power control method including the steps of 301-302.

Step 301: receiving a power control parameter corresponding to a resource in an uplink beam management resource set used for an uplink beam management procedure.

In some embodiments of the present disclosure, the uplink beam management procedure may include an identical beam or a plurality of different beams being adopted by a user equipment.

The uplink beam management resource set may include one or more of an SRS resource set, a PRACH resource set, and a PUCCH resource set, wherein the SRS resource set may include one or more SRS resources, the PRACH resource set may include one or more PRACH resources and the PUCCH resource set may include one or more PUCCH resources.

Optionally, each of one or more of the SRS resource set, the PRACH resource set, and the PUCCH resource set may include resources corresponding to the same resource identifier and/or resources corresponding to different resource identifiers, wherein, resources corresponding to the same resource identifier are the same, and resources corresponding to different resource identifiers are different. For example, in a case that the uplink beam management resource set includes the SRS resource set and the PRACH resource set, the SRS resource set may include SRS resources corresponding to the same resource identifier and/or SRS resources corresponding to different resource identifiers. Similarly, the PRACH resource set may also include PRACH resources corresponding to the same resource identifier and/or PRACH resources corresponding to different resource identifiers.

Optionally, the above power control parameter is used for power control of resources in the uplink beam management resource set. For example, the above power control parameter may include, but is not limited to, one or more of an open-loop power control parameter set, a closed-loop power control parameter set and a transmission power.

Optionally, the open-loop power control parameter set may include, but is not limited to, one or more of a target reception power, a path loss compensation factor, and a power offset; the closed-loop power control parameter set may include, but is not limited to, one or more of a power adjustment value, the number of resource blocks, and a modulation and coding scheme.

It will be understood that the embodiments of the present disclosure may reasonably configure the above-described power control parameter according to actual conditions.

It will be understood that the embodiments of the present disclosure may configure only one power control parameter for all resources in the uplink beam management resource set, and may also configure a power control parameter for each resource in the uplink beam management resource set.

Step 302: sending a resource in the uplink beam management resource set according to a power control parameter corresponding to the resource in the uplink beam management resource set.

In the embodiments of the present disclosure, after the terminal receives the power control parameter, the terminal may send the resource in the resource set based on the power control parameter. For example, in a case that the power control parameter is the transmission power, the terminal may send, using the transmission power, the resource in the uplink beam management resource set used for the uplink beam management procedure; in a case that the power control parameter is the open-loop power control parameter set and/or the closed-loop power control parameter set, the terminal may calculate the transmission power according to the open-loop power control parameter set and/or the closed-loop power control parameter set, and further send, using the transmission power, the resource in the uplink beam management resource set used for the uplink beam management procedure.

Thus, the power control method according to some embodiments of the present disclosure receives the power control parameter corresponding to the resource in the uplink beam management resource set used for the uplink beam management procedure, and sends the resource in the uplink beam management resource set according to the power control parameter corresponding to the resource in the uplink beam management resource set. In this way, power control of resources in the uplink beam management resource set used for the uplink beam management procedure is realized, and a signaling overhead of the power control of uplink beam management resources used for the uplink beam management procedure can be controlled.

Optionally, the uplink beam management resource set includes one or more of a Sounding Reference Signal (SRS) resource set, a Physical Random Access Channel (PRACH) resource set, and a Physical Uplink Control Channel (PUCCH) resource set, wherein, each of one or more of the SRS resource set, the PRACH resource set, and the PUCCH resource set includes resources corresponding to the same resource identifier and/or resources different resource identifiers.

The power control parameter includes one or more of an open-loop power control parameter set, a closed-loop power control parameter set, a transmission power, a path loss value, and a reference beam set identifier.

In some embodiments of the present disclosure, the SRS resource set may include one or more SRS resources. The PRACH resource set may include one or more PRACH resources. The PUCCH resource set may include one or more PUCCH resources. Each of the above SRS resource set, the PRACH resource set, and the PUCCH resource set may include the same resource and/or different resources. For example, the PRACH resource set may include PRACH resources having the same channel type and the same beam, and/or PRACH resources having different channel types or PRACH resources having the same channel type but different beams. In particular, the embodiments of the present disclosure may identify the same resource and different resources according to a resource identifier, and accordingly, each of the above SRS resource set, the PRACH resource set and the PUCCH resource set may include resources corresponding to the same resource identifier and/or resources different resource identifiers.

The reference beam set identifier described above may include one or more reference beam identifiers.

The power control parameter described above may include, but is not limited to, one or more of an open-loop power control parameter set, a closed-loop power control parameter set, and a transmission power, wherein the open-loop power control parameter set may include one or more open-loop power control parameters, such as a target reception power, a path loss compensation factor, and so on; the closed-loop power control parameter set may include one or more closed-loop power control parameters, for example, a power adjustment value, the number of resource blocks, and the like. It will be understood that the embodiments of the present disclosure may reasonably configure the above-described power control parameter according to actual conditions.

Optionally, the open-loop power control parameter set includes one or more of a target reception power, a path loss compensation factor, and a power offset; and the closed-loop power control parameter set includes one or more of a power adjustment value, the number of resource blocks, and a modulation and coding scheme.

In some embodiments of the present disclosure, the open-loop power control parameter set may include, but is not limited to, one or more of a target reception power, a path loss compensation factor, a power offset; the closed-loop power control parameter set may include, but is not limited to, one or more of a power adjustment value, the number of resource blocks, a modulation and coding scheme.

It may be understood that the embodiments of the present disclosure may reasonably configure the open-loop power control parameter set and the closed-loop power control parameter set as described above according to actual conditions.

Optionally, power control parameters corresponding to respective resources in the uplink beam measurement resource set used for the same uplink beam measurement procedure are the same.

In the embodiments of the present disclosure, all resources in the beam management resource set used for the uplink beam management procedure may correspond to the common power control parameter. That is, all resources in the uplink beam management resource set used for the uplink beam management procedure correspond to the common power control parameter, so that the terminal sends all resources in the beam management resource set according to the common power control parameter. Optionally, in the embodiments of the present disclosure, each resource in the beam management resource set used for the uplink beam management procedure may also correspond to a corresponding power control parameter, and power control parameters corresponding to the resources are the same, so that the terminal can send each resource using the same transmission power and the network device may better evaluate the quality of the uplink beam of the terminal.

Optionally, sending the resource in the uplink beam management resource set according to the power control parameter corresponding to the resource in the uplink beam management resource set, includes: calculating a transmission power corresponding to the resource in the uplink beam management resource set, according to the power control parameter corresponding to the resource in the uplink beam management resource set, wherein, the power control parameter includes one or more of an open-loop power control parameter set, a closed-loop power control parameter set, a path loss value, and a reference beam set identifier; and sending the resource in the uplink beam management resource set using the transmission power corresponding to the resource in the uplink beam management resource set.

In the embodiments of the present disclosure, in a case that the power control parameter includes one or more of an open-loop power control parameter set, a closed-loop power control parameter set, a path loss value, and a reference beam set identifier, the terminal needs to calculate a transmission power corresponding to the resource in the resource set according to the power control parameter and further send respective resources in the resource set using the transmission power.

For example, in a case that the power control parameter is the open-loop power control parameter set and the closed-loop power control parameter set, the transmission power may be firstly calculated according to the open-loop power control parameter set and the closed-loop power control parameter set; in a case that the power control parameter is a path loss value, the transmission power may be calculated firstly according to the path loss value; in a case that the power control parameter is the reference beam set identifier, the transmission power may be firstly calculated according to the reference beam set identifier.

Optionally, in a case that the power control parameter includes the open-loop power control parameter set and/or the closed-loop power control parameter set, sending the resource in the uplink beam management resource set according to the power control parameter corresponding to the resource in the uplink beam management resource set, includes: obtaining the reference power control parameter, wherein, the reference power control parameter includes the power control parameter of a Physical Uplink Shared Channel (PUSCH) or a power control parameter of a Physical Random Access Channel (PRACH) or a power control parameter of a Physical Uplink Control Channel (PUCCH)

or a power control parameter of a Sounding Reference Signal (SRS); determining the transmission power corresponding to the resource in the uplink beam management resource set according to a part of power control parameters in the open-loop power control parameter set and/or a part of power control parameters in the closed-loop power control parameter set corresponding to resources in the uplink beam management resource set and the reference power control parameter; sending the resource in the uplink beam management resource set using the transmission power corresponding to the resource in the uplink beam management resource set.

In the embodiments of the present disclosure, the terminal may calculate the transmission power in conjunction with the reference power control parameter and a part of power control parameters in the open loop-power control parameter set and/or a part of power control parameters in the closed-loop power control parameter set configured on a network device side. The reference power control parameter may include a power control parameter of the PUSCH or a power control parameter of the PRACH or a power control parameter of the PUCCH or a power control parameter of the SRS.

For example, the reference power control parameter described above may be configured according to a power control parameter of a PUSCH most recently sent, or a power control parameter of a PRACH most recently sent, or a power control parameter of a PUCCH most recently sent, or a power control parameter of the SRS most recently sent.

It should be noted that the reference power parameter may be one or more of power control parameters of a PUSCH, for example, the reference power parameter includes only a target reception power of the PUSCH.

Optionally, a part of power control parameters in the open-loop power control parameter set and/or a part of power control parameters in the closed-loop power control parameter set may be determined based on a reference power parameter configured at a terminal side. For example, in a case that the terminal side configures the target reception power, the network device side may configure one or more of remaining power control parameters other than the target reception power, for example, the path loss compensation factor, the power offset, and the like.

Embodiments of the present disclosure may reduce a control signaling overhead by referring to power control parameters of other channels or signals.

Optionally, obtaining the reference power control parameter includes obtaining a power control parameter of a current or historical PUSCH, or a power control parameter of a current or historical PRACH, or a power control parameter of a current or historical PUCCH, or a power control parameter of a current or historical Sounding Reference Signal (SRS) as the reference power control parameter.

In the embodiments of the present disclosure, the power control parameter of the current or historical PUSCH may be obtained as the reference power control parameter, or the power control parameter of the current or historical PRACH may be obtained as the reference power control parameter, or the power control parameter of the current or historical PUCCH may be obtained as the reference power control parameter, or the power control parameter of the current or historical Sounding Reference Signal (SRS) may be obtained as the reference power control parameter.

Optionally, the reference power control parameter is determined by a beam or a beam pair corresponding to a path loss value of a resource in the uplink beam management resource set, or, determined by a beam or a beam pair corresponding to one path loss value of path loss values of transmission beams or transmission beam pairs of at least two Channel State Information Reference Signal (CSI-RS) sets or at least two synchronization signal block sets, wherein an absolute value of a difference value between the one path loss value and the path loss value of the resource in the uplink beam management resource set is minimum among absolute values of difference values between the path loss values and the path loss value of the resource in the uplink beam management resource set.

For example, in a case that a terminal takes the maximum value between the path loss value "a" of the transmission beam or the transmission beam pair for a CSI-RS having an identifier "a" and the path loss value "b" of the transmission beam or the transmission beam pair for a CSI-RS having an identifier "b" as the path loss value corresponding to the resource in the uplink beam management resource set, and in a case that the path loss value "a" is greater than the path loss value "b", then the path loss value corresponding to the resource in the uplink beam management resource set is the path loss value "a", and the above reference power control parameter may be determined based on the downlink beam or the downlink beam pair used to calculate the path loss value "a", i.e., the transmission beam or the transmission beam pair for the CSI-RS having the identifier "a". In a case that the terminal takes a weighted average value of the path loss value "a" of the transmission beam or the transmission beam pair for a CSI-RS having the identifier "a" and the path loss value "b" of the transmission beam or the transmission beam pair for a CSI-RS having the identifier "b" as the path loss value corresponding to the resource in the uplink beam management resource set, and in a case that an absolute value of a difference value between the path loss value "a" and the weighted average value "c" is smaller than an absolute value of a difference value between the path loss value "b" and the weighted average value "c", then the reference power control parameter may be determined according to the transmission beam or the transmission beam pair for the CSI-RS having the identifier "a".

Optionally, before sending the resource in the uplink beam management resource set according to the power control parameter corresponding to the resource in the uplink beam management resource set, the method further includes: determining a path loss value corresponding to the resource in the uplink beam management resource set based on a path loss value of a transmission beam or a transmission beam pair of a Channel State Information Reference Signal (CSI-RS) set or a synchronization signal block set.

In the embodiments of the present disclosure, the path loss value corresponding to the resource in the uplink beam management resource set may be determined based on a path loss value of a transmission beam or a transmission beam pair of a CSI-RS set or a synchronization signal block set. For example, the maximum value of path loss values of transmission beams or transmission beam pairs of CSI-RS sets or synchronization signal block sets may be taken as the path loss value corresponding to the resource in the resource set. The minimum value of the path loss values of the transmission beams or the transmission beam pairs of the CSI-RS sets or the synchronization signal block sets may also be taken as the path loss value corresponding to the resource in the resource set.

Optionally, determining the path loss value corresponding to the resource in the uplink beam management resource set based on the path loss value of the transmission beam or the transmission beam pair of the Channel State Information Reference Signal (CSI-RS) set or the synchronization signal block set includes: determining the maximum value of the path loss values of transmission beams or transmission beam pairs of at least two CSI-RSs and/or at least two synchronization signal blocks as the path loss value corresponding to the resource in the uplink beam management resource set; or determining the minimum value of the path loss values of transmission beams or transmission beam pairs of at least two CSI-RSs and/or at least two synchronization signal blocks as the path loss value corresponding to the resource in the uplink beam management resource set; or determining an intermediate value among the path loss values of transmission beams or transmission beam pairs of at least two CSI-RSs and/or at least two synchronization signal blocks as the path loss value corresponding to the resource in the uplink beam management resource set; or determining a weighted average value of the path loss values of transmission beams or transmission beam pairs of at least two CSI-RSs and/or at least two synchronization signal blocks as the path loss value corresponding to the resource in the uplink beam management resource set.

Optionally, before determining the path loss value corresponding to the resource in the uplink beam management resource set based on the path loss value of the transmission beam or the transmission beam pair of the Channel State Information Reference Signal (CSI-RS) set or the synchronization signal block set, the method further includes: receiving a CSI-RS set or a synchronization signal block set configured by a network device, wherein the CSI-RS set or the synchronization signal block set is used for calculating the path loss value of the resource in the uplink beam management resource set; or receiving a measurement resource set configured by a network device; determining a channel state information reference signal set or a synchronization signal block set used for calculating a path loss value of the resource in the uplink beam management resource set, according to a Reference Signal Receiving Power (RSRP) or a Signal to Interference Plus Noise Ratio (SINR) of a measurement resource in the measurement resource set.

In some embodiments of the present disclosure, the network device may configure a Channel State Information Reference Signal (CSI-RS) set or a synchronization signal block set used to calculate a path loss value of the resource in the uplink beam management resource set, and send the Channel State Information Reference Signal (CSI-RS) set or the synchronization signal block set to the terminal, so that the terminal may calculate the path loss value of the resource in the resource set based on the CSI-RS set or the synchronization signal block set sent by the network device, wherein the CSI-RS set may include one or more CSI-RS, the synchronization signal block set described above may include one or more synchronization signal blocks. For example, the above synchronization signal block set may be Synchronization Signal (SS) block (i.e., Block) in a 5G system. It may be understood that the above synchronization signal block set may also be synchronization signal blocks in other mobile communication systems. The RSRP may be a first-layer RSRP (L1-RSRP), or a third-layer RSRP (L3-RSRP).

Optionally, the network device in the embodiments of the present disclosure may also configure a measurement resource set and send the measurement resource set to the terminal, wherein the measurement resource set includes a plurality of measurement resources, and the measurement resources may be CSI-RSs or synchronization signal blocks.

Optionally, the terminal determines the CSI-RS set or the synchronization signal block set used to calculate the path loss value of the resource in the uplink beam measurement resource set, according to a Reference Signal Receiving Power (RSRP) or a Signal to Interference Plus Noise Ratio (SINR) of each measurement resource. For example, N measurement resources with relatively larger RSRPs or relatively larger SINRs may be obtained from M measurement resources and taken as a CSI-RS set or a synchronization signal block set for calculating the path loss value of the resource in the uplink beam management resource set, where M, N are all positive integers, M>=N.

It may be understood that, in the embodiments of the present disclosure a CSI-RS set or a synchronization signal block set described above for calculating the path loss value of the resource in the uplink beam management resource set may also be predefined in a protocol (Technical Specification or Technical Protocol).

Optionally, the method further includes reporting a Reference Signal Receiving Power (RSRP) based on periodic or semi-persistent channel state information reference signals (CSI-RS) or periodic or semi-persistent synchronization signal blocks.

In the embodiments of the present disclosure, the terminal may report the RSRP based on the periodic or semi-persistent channel state information reference signals or synchronization signal blocks. Thus, the network device may calculate the transmission power according to the RSRP reported based on the periodic or semi-persistent CSI-RSs or the periodic or semi-persistent synchronization signal blocks.

It should be noted that the above periodic CSI-RS set and/or synchronization signal block set may be a set of CSI-RSs periodically sent and/or a set of synchronization signal blocks periodically sent. The semi-persistent CSI-RS set and/or synchronization signal block set described above may be a set of CSI-RSs periodically sent within a time period (e.g., which may be determined by a configured start time point and a configured end time point), and/or a set of synchronization signal blocks periodically sent over a time period. The above RSRP may include an L3-RSRP or an L1-RSRP.

Optionally, the power control parameters corresponding to the resources in the uplink beam management resource sets used for different uplink beam management procedures are different; the power control parameters corresponding to non-quasi-colocation resource subsets of the uplink beam management resource set used for one uplink beam management procedure are different.

In some embodiments of the present disclosure, different power control parameters may be configured for resources in uplink beam management resource sets used for different uplink beam management procedures. For example, a power control parameter "a" is configured for the resource in the uplink beam management resource set used for an uplink beam management procedure "a", a power control parameter "b" is configured for the resource in the uplink beam management resource set used for the uplink beam management procedure "b", where the power control parameter "a" and the power control parameter "b" are different.

Optionally, the embodiments of the present disclosure may configure different power control parameters for non-quasi-colocation resources in the same uplink beam management resource set.

The embodiments of the present disclosure configure different power control parameters for resources in uplink beam management resource sets used for different uplink beam management procedures, and configure different power control parameters for resources in the non-quasicolocation resource subsets of the uplink beam management resource set used for the uplink beam management procedure, to improve an accuracy of power control.

The power control method implemented by the present disclosure is described below with reference to examples:

Specifically, in an uplink beam management procedure of an NR system (including a case that a UE adopts multiple identical or different beam transmission resources), calculation of a transmission power of an identical resource or different resources (including resources having different channel types and/or having the same channel type but different beams) in an uplink beam management resource set (e.g., including one or more SRS resources and/or one or more PRACH resources and/or one or more PUCCH resources, etc.) includes at least the following implementations:

a first implementation:

the network device configures the same open-loop power control parameter set (e.g., the target reception power, the path loss compensation factor, a power offset, etc.) and/or closed-loop power control parameter set (e.g., the power adjustment value, the number of resource blocks, etc.) for the uplink beam management resource set used for an uplink beam management procedure, and sends the open-loop power control parameter set and/or closed-loop power control parameter set to a terminal.

The terminal may calculate a path loss value based on the periodic or semi-persistent CSI-RSs and/or synchronization signal blocks (i.e. SS blocks), and may further calculate the transmit power based on the open-loop power control parameter set and/or the closed-loop power control parameter set configured by the network device and the path loss value.

Figure 4:
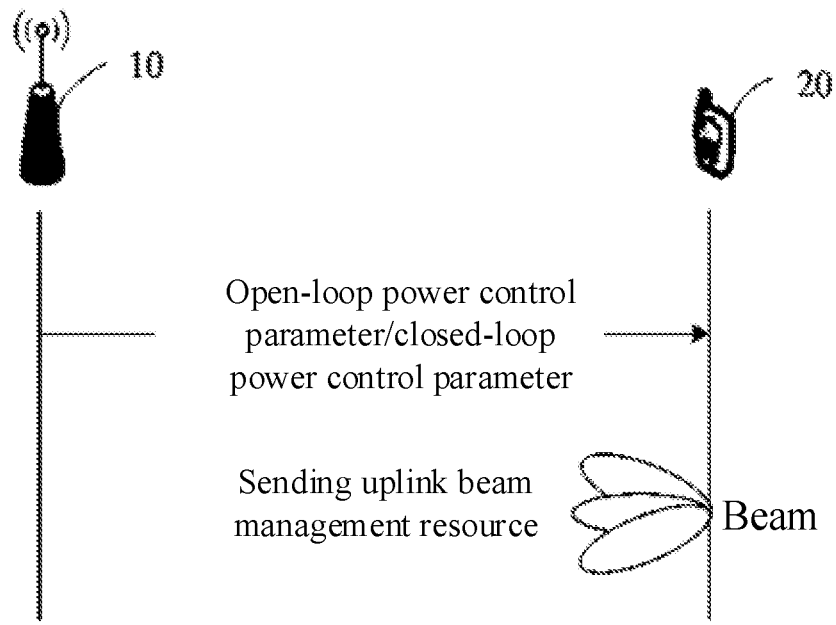
FIG. 4 is a flowchart of a power control method provided by still another embodiment of the present disclosure.

For example, referring to FIG. 4, the network device 10 (i.e., the network side) configures the same open-loop power control parameter and/or closed-loop power control parameter for uplink beam management resources used for the uplink beam management procedures, and sends the open-loop power control parameter and/or closed-loop power control parameter to the terminal 20. The terminal 20 sends the uplink beam management resources using the same transmission power in an uplink beam management procedure based on the open-loop power control parameter and/or the closed-loop power control parameter configured by the network side.

Figure 5:
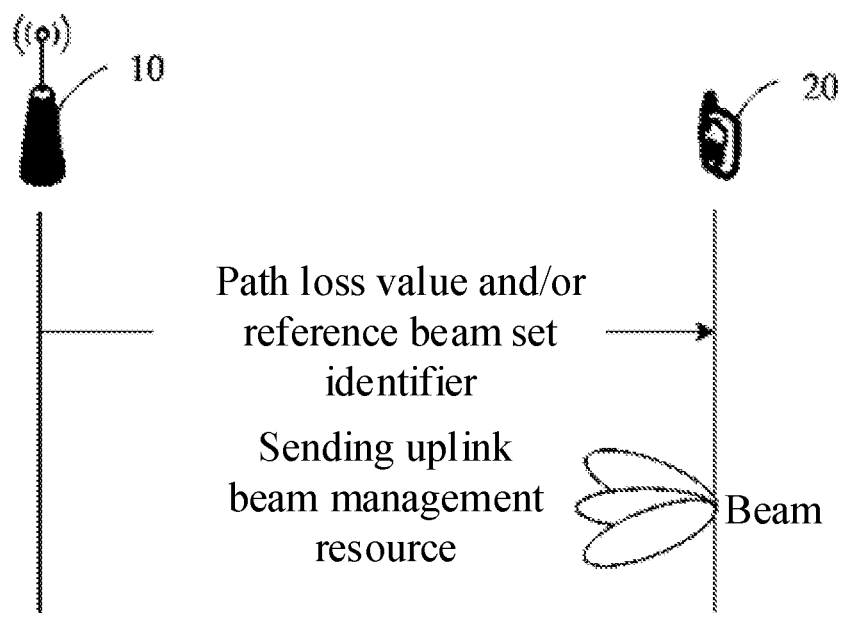
FIG. 5 is a flowchart of a power control method provided by still another embodiment of the present disclosure.

Optionally, referring to FIG. 5, in the embodiments of the present disclosure, the network device 10 may further configure the same path loss value and/or the same reference beam set identifier for the same resource or different resources in the uplink beam management resource set used for the uplink beam management procedure, and send the path loss value and/or the reference beam set identifier to the terminal 20, wherein the reference beam set identifier includes one or more identifiers of one or more reference beams. The terminal 20 sends the uplink beam management resources using the same transmission power in an uplink beam management procedure based on the path loss value and/or the reference beam set identifier configured by the network device 10.

A second implementation:

The network side configures the same transmission power for the same resource or different resources in the uplink beam management resource set used for the uplink beam management procedure. Optionally, the network side may calculate the transmission power according to an L3-RSRP or an L1-RSRP reported by a terminal side based on the periodic or semi-persistent CSI-RSs or the synchronization signal blocks (SS Blocks), and send the calculated transmission power to the terminal.

Figure 6:
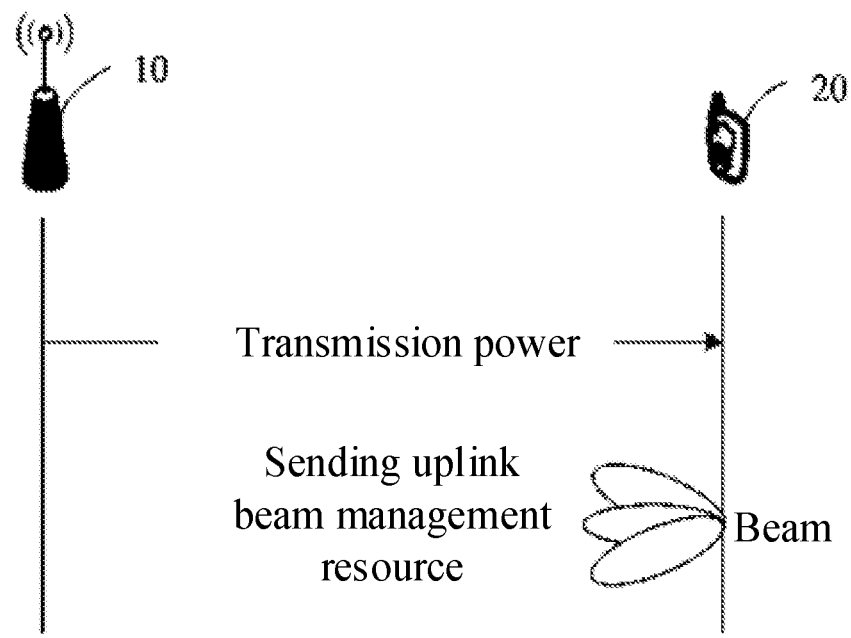
FIG. 6 is a flowchart of a power control method provided by still another embodiment of the present disclosure.

For example, referring to FIG. 6, the network device 10 (i.e., the network side) configures the same transmission power for uplink beam management resources used for the uplink beam management procedure, and sends the transmission power to the terminal 20. The terminal 20 sends the uplink beam management resources using the same power in an uplink beam management procedure based on the transmission power configured by the network side.

The embodiments of the present disclosure can effectively reduce the control signaling overhead by configuring the transmission power of the uplink beam management resources.

A third implementation:

The terminal may configure the same transmission power for the same resource or different resources in the uplink beam management resource set used for the uplink beam management procedure, by referring to power control parameters (e.g., the target reception power) of the most recently sent PUSCH or PRACH, and in conjunction with some power control parameters, configured by the network side, other than the power control parameters of the most recently sent PUSCH or PRACH.

Figure 7:
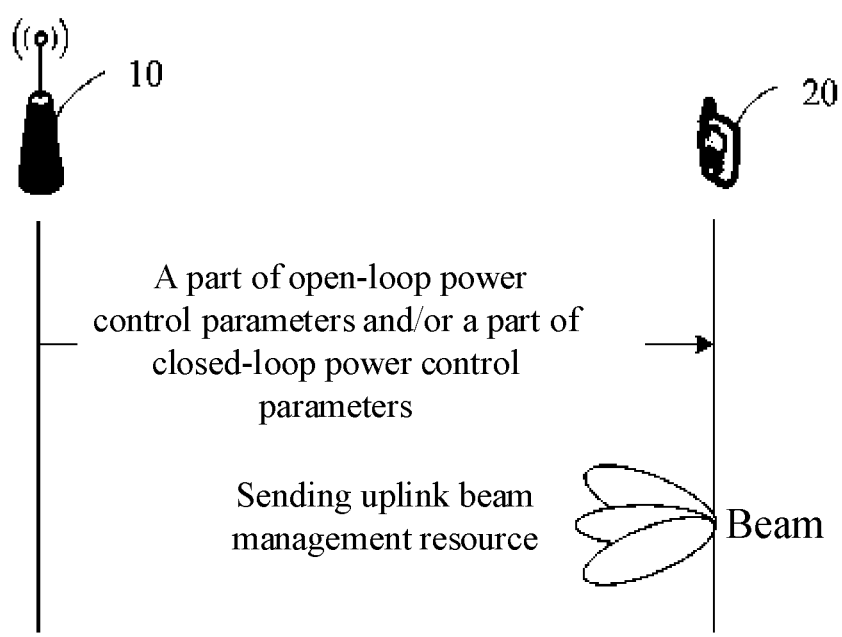
FIG. 7 is a flowchart of a power control method provided by still another embodiment of the present disclosure.

Referring to FIG. 7, the network device 10 (i.e., the network side) configures the same part of power control parameters and/or the same part of closed-loop power control parameters for uplink beam management resources used for the uplink beam management procedure, and sends the same part of the power control parameters and/or the same part of the closed-loop power control parameters to the terminal 20, wherein the same part of the power control parameters and/or the same part of the closed-loop power control parameters may be determined based on the power control parameter configured at the terminal side. The terminal 20 sends the above uplink beam management resources using the same transmission power in an uplink beam management procedure, by referring to the power control parameter of the most recent PUSCH or PRACH, and combining the part of power control parameters and/or the part of closed-loop power control parameters configured by the network side. The embodiments of the present disclosure may reduce a control signaling overhead by referring to power control parameters of other channels or signals.

Optionally, in the embodiments of the present disclosure, the transmission powers of the same resource or different resources in the uplink beam management resource set may be the same. The transmission powers of the same resource or different resources among uplink beam management resource sets may be different.

Figure 8:
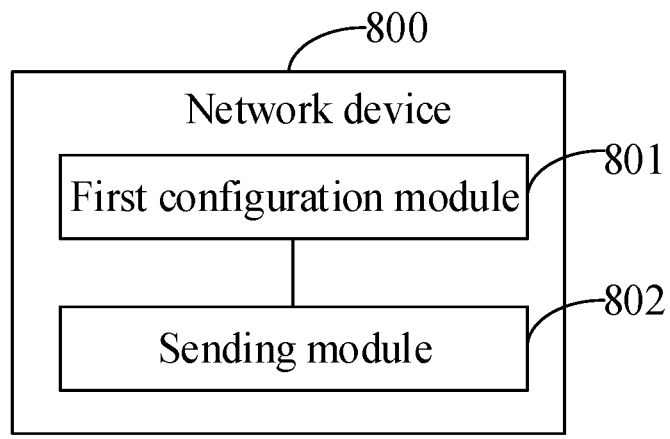
FIG. 8 is a first structural diagram of a network device provided by some embodiments of the present disclosure.

Referring to FIG. 8, FIG. 8 is a structural diagram of a network device provided by some embodiments of the present disclosure. As shown in FIG. 8, the network device 800 includes a first configuration module 801 and a sending module 802, wherein: the first configuration module 801 is used to configure a power control parameter for a resource in an uplink beam management resource set used for an uplink beam management procedure; and the sending module 802 is used to send the power control parameter to the terminal, so that the terminal sends the resource in the uplink beam management resource set according to the power control parameter.

Optionally, the uplink beam management resource set includes one or more of a Sounding Reference Signal (SRS) resource set, a Physical Random Access Channel (PRACH) resource set, and a Physical Uplink Control Channel (PUCCH) resource set, wherein each of one or more of the SRS resource set, the PRACH resource set, and the PUCCH resource set may include resources corresponding to the same resource identifier and/or resources corresponding to different resource identifiers.

The power control parameter includes one or more of an open-loop power control parameter set, a closed-loop power control parameter set, a transmission power, a path loss value and a reference beam set identifier.

Optionally, the open-loop power control parameter set includes one or more of a target reception power, a path loss compensation factor, and a power offset; the closed-loop power control parameter set includes one or more of a power adjustment value, the number of resource blocks, and a modulation and coding scheme.

Optionally, the first configuration module 801 is specifically used to: configure the common power control parameter for resources in the uplink beam management resource set used for the uplink beam management procedure; or configure a corresponding power control parameter for each resource in the uplink beam management resource set used for the uplink beam management procedure, respectively, wherein corresponding power control parameters for respective resources are the same.

Optionally, the open-loop power control parameter set and/or the closed-loop power control parameter set are determined by a downlink beam or a downlink beam pair used to calculate a path loss value of a resource in the uplink beam management resource set, or, determined by an uplink beam or an uplink beam pair corresponding to the downlink beam or the downlink beam pair used to calculate a path loss value of a resource in the uplink beam management resource set; or the open-loop power control parameter set and/or the closed-loop power control parameter set are determined based on a reference power control parameter, wherein the reference power control parameter includes a power control parameter of a Physical Uplink Shared Channel (PUSCH) or a power control parameter of a Physical Random Access Channel (PRACH) or a power control parameter of a Physical Uplink Control Channel (PUCCH) or a power control parameter of a Sounding Reference Signal (SRS); and/or the path loss value is calculated from one or more Reference Signal Receiving Power (RSRP) values reported by the terminal based on a channel state information reference signal (CSI-RS) set and/or a synchronization signal block set; and/or the reference beam set identifier is determined based on a beam reported by a terminal.

Optionally, the first configuration module 801 is specifically used to: configure a part of power control parameters in the open-loop power control parameter set and/or a part of power control parameters in the closed-loop power control parameter set for resources in the uplink beam management resource set used for the uplink beam management procedure.

Figure 9:
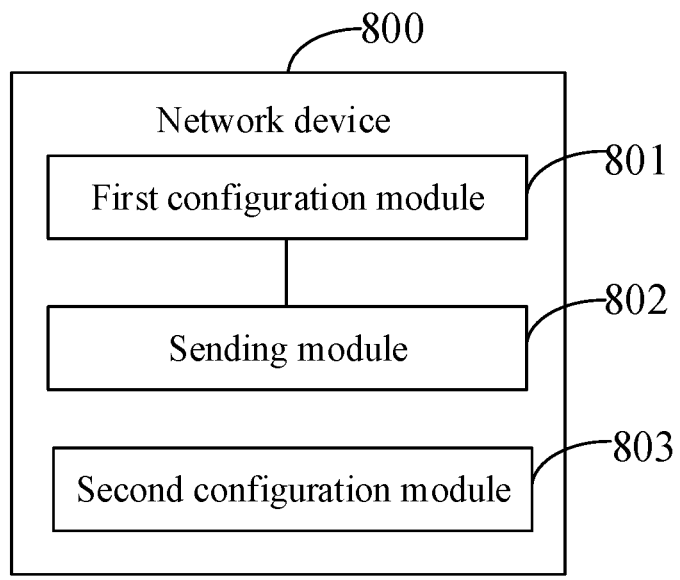
FIG. 9 is a second structural diagram of a network device provided by some embodiments of the present disclosure.

Optionally, referring to FIG. 9, the network device 800 further includes a second configuration module 803, wherein the second configuration module is specifically used to: configure a channel state information reference signal (CSI-RS) set or a synchronization signal block set for calculating a path loss value of the resource in the uplink beam management resource set, and send the CSI-RS set or the synchronization signal block set to a terminal; or configure a measurement resource set and send the measurement resource set to a terminal.

Optionally, in a case that the power control parameter is the transmission power, the first configuration module 801 is specifically used to: receive a Reference Signal Receiving Power (RSRP) reported by the terminal based on periodic or semi-persistent channel state information reference signals or synchronization signal blocks; and calculate the transmission power according to the RSRP.

Optionally, the first configuration module 801 is specifically used to configure different power control parameters for resources in uplink beam management resource sets used for different uplink beam management procedures; configure different power control parameters for resources in non-quasi-colocation resource subsets of an uplink beam management resource set used for one uplink beam management procedure.

The network device 800 can implement each process performed by the network device in any of the above method embodiments, and achieve the same or similar effect. To avoid repetition, detailed description thereof will not be described here.

A network device 800 according to some embodiments of the present disclosure configures a power control parameter for a resource in an uplink beam management resource set used for an uplink beam management procedure through the first configuration module 801, and sends the power control parameter to the terminal through the sending module 802, so that the terminal sends a resource in the uplink beam management resource set according to the power control parameter. The power control of the resource in the uplink beam management resource set used for the uplink beam management procedure is realized, and a signaling overhead of the power control of an uplink beam management resource used for the uplink beam management procedure can be controlled.

Figure 10:
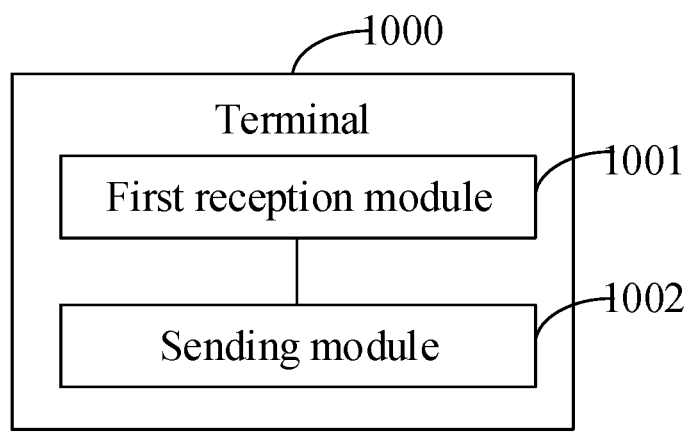
FIG. 10 is a first structural diagram of a terminal provided by some embodiments of the present disclosure.

Referring to FIG. 10, FIG. 10 is a structural diagram of a terminal provided by some embodiments of the present disclosure. As shown in FIG. 10, the terminal 1000 includes a first reception module 1001 and a sending module 1002, wherein: the first reception module 1001 is used to receive a power control parameter corresponding to a resource in an uplink beam management resource set used for an uplink beam management procedure; and the sending module 1002 is used to send the resource in the uplink beam management resource set according to a power control parameter corresponding to the resource in the uplink beam management resource set.

Optionally, the uplink beam management resource set includes one or more of a Sounding Reference Signal (SRS) resource set, a Physical Random Access Channel (PRACH) resource set, and a Physical Uplink Control Channel (PUCCH) resource set, wherein each of one or more of the SRS resource set, the PRACH resource set, and the PUCCH resource set may include resources corresponding to the same resource identifier and/or resources corresponding to different resource identifiers.

The power control parameter includes one or more of an open-loop power control parameter set, a closed-loop power control parameter set, a transmission power, a path loss value and a reference beam set identifier.

Optionally, the open-loop power control parameter set includes one or more of a target reception power, a path loss compensation factor, and a power offset; the closed-loop power control parameter set includes one or more of a power adjustment value, the number of resource blocks, and a modulation and coding scheme.

Optionally, power control parameters corresponding to respective resources in the uplink beam measurement resource set used for the same uplink beam measurement procedure are the same.

Figure 11:
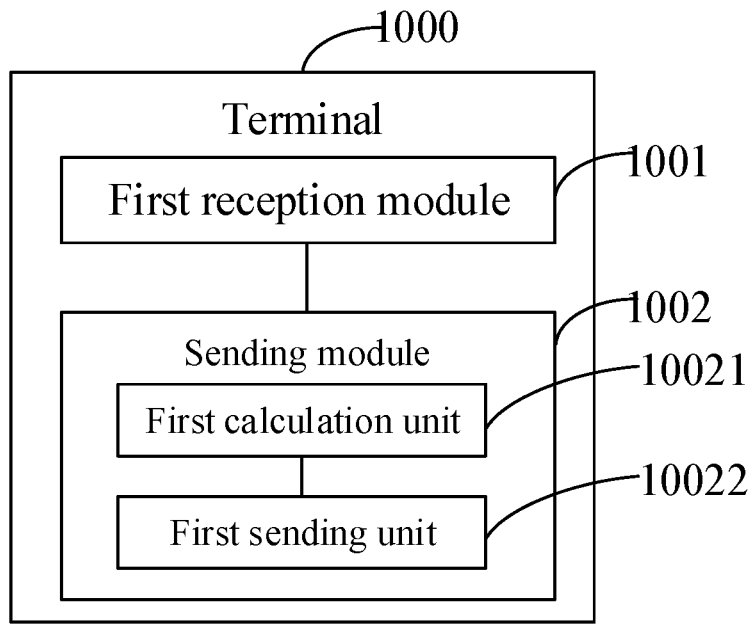
FIG. 11 is a second structural diagram of a terminal provided by some embodiments of the present disclosure.

Optionally, referring to FIG. 11, the sending module 1002 includes: a first calculation unit 10021 and a first sending unit 10022. The first calculation unit 10021 is used to calculate a transmission power corresponding to the resource in the uplink beam management resource set, according to the power control parameter corresponding to the resource in the uplink beam management resource set, wherein, the power control parameter includes one or more of an open-loop power control parameter set, a closed-loop power control parameter set, a path loss value, and a reference beam set identifier; and the first sending unit 10022 is used to send the resource in the uplink beam management resource set using the transmission power corresponding to the resource in the uplink beam management resource set.

Figure 12:
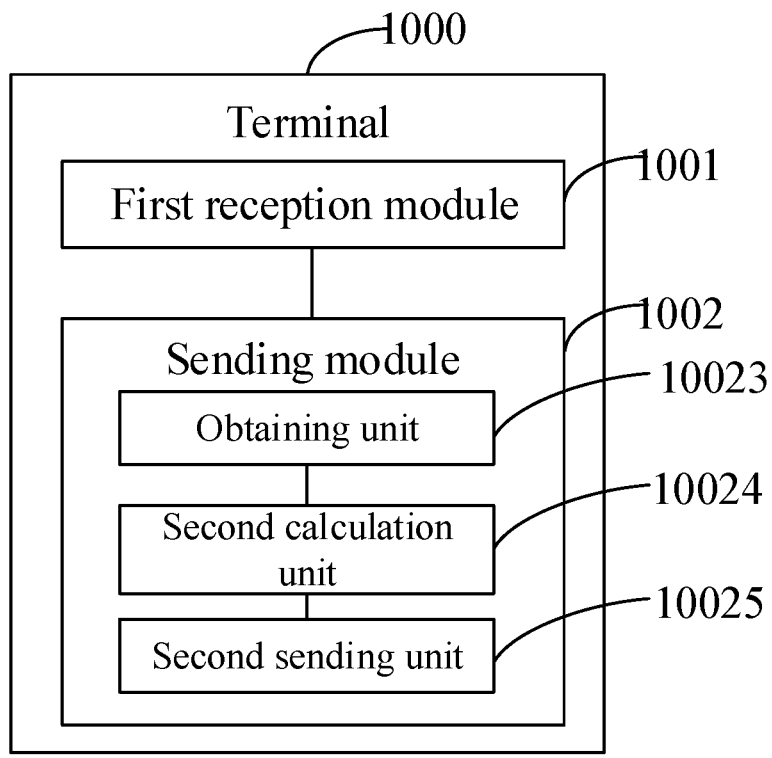
FIG. 12 is a third structural diagram of a terminal provided by some embodiments of the present disclosure.

Optionally, referring to FIG. 12, in a case that the power control parameter includes the open-loop power control parameter set and/or the closed-loop power control parameter set, the sending module 1002 includes: an obtaining unit 10023, a second calculation unit 10024, and a second sending unit 10025. The obtaining unit 10023 is used to obtain a reference power control parameter, wherein, the reference power control parameter includes a power control parameter of a Physical Uplink Shared Channel (PUSCH) or a power control parameter of a Physical Random Access Channel (PRACH) or a power control parameter of a Physical Uplink Control Channel (PUCCH) or a power control parameter of a Sounding Reference Signal (SRS). The second calculation unit 10024 is used to determine the transmission power corresponding to the resource in the uplink beam management resource set according to a part of power control parameters in the open-loop power control parameter set and/or a part of power control parameters in the closed-loop power control parameter set corresponding to resources in the uplink beam management resource set and the reference power control parameter. The second sending unit 10025 is used to send the resource in the uplink beam management resource set using the transmission power corresponding to the resource in the uplink beam management resource set.

Optionally, the obtaining unit 10023 is specifically used to: obtain a power control parameter of a current or historical PUSCH, or a power control parameter of a current or historical PRACH, or a power control parameter of a current or historical PUCCH, or a power control parameter of a current or historical Sounding Reference Signal (SRS) as the reference power control parameter.

Optionally, the reference power control parameter is determined by a beam or a beam pair corresponding to a path loss value of a resource in the uplink beam management resource set, or, determined by a beam or a beam pair corresponding to one path loss value of path loss values of transmission beams or transmission beam pairs of at least two Channel State Information Reference Signal (CSI-RS) sets or at least two synchronization signal block sets, wherein an absolute value of a difference value between the one path loss value and the path loss value of the resource in the uplink beam management resource set is minimum among absolute values of difference values between the path loss values and the path loss value of the resource in the uplink beam management resource set.

Figure 13:
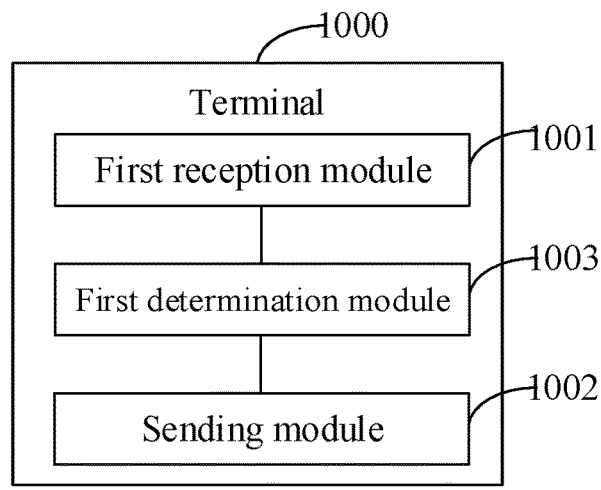
FIG. 13 is a fourth structural diagram of a terminal provided by some embodiments of the present disclosure.

Optionally, referring to FIG. 13, before sending the resource in the uplink beam management resource set according to the power control parameter corresponding to the resource in the uplink beam management resource set, the terminal 1000 further includes a first determination module 1003, the first determination module 1003 is used to determine a path loss value corresponding to the resource in the uplink beam management resource set based on a path loss value of a transmission beam or a transmission beam pair of a Channel State Information Reference Signal (CSI-RS) set or a synchronization signal block set.

Optionally, the first determination module 1003 is specifically used to: determine a maximum value of path loss values of transmission beams or transmission beam pairs of at least two CSI-RSs and/or at least two synchronization signal blocks as the path loss value corresponding to the resource in the uplink beam management resource set; or determine a minimum value of the path loss values of transmission beams or transmission beam pairs of at least two CSI-RSs and/or at least two synchronization signal blocks as the path loss value corresponding to the resource in the uplink beam management resource set; or determine an intermediate value among the path loss values of transmission beams or transmission beam pairs of at least two CSI-RSs and/or at least two synchronization signal blocks as the path loss value corresponding to the resource in the uplink beam management resource set; or determine a weighted average value of the path loss values of transmission beams or transmission beam pairs of at least two CSI-RSs and/or at least two synchronization signal blocks as the path loss value corresponding to the resource in the uplink beam management resource set.

Figure 14:
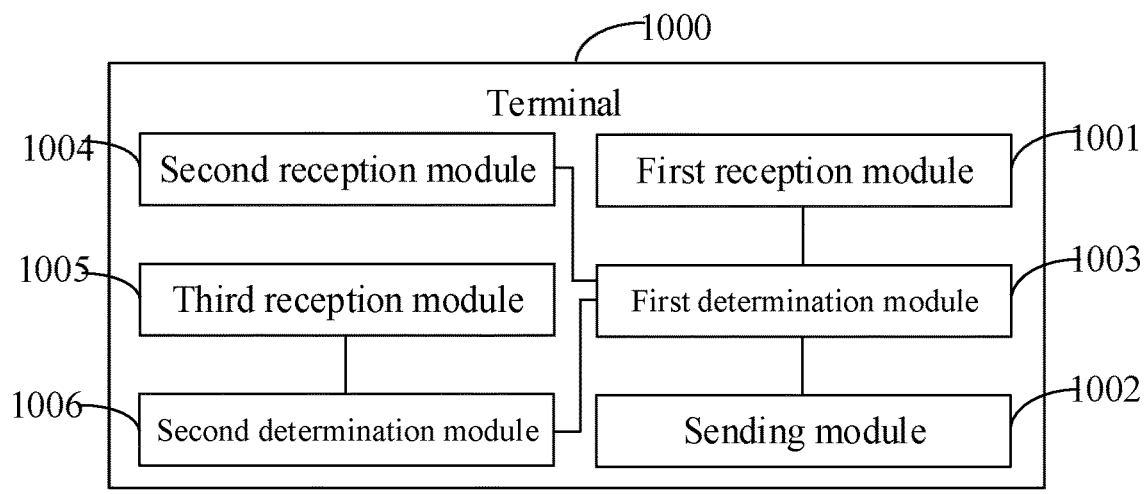
FIG. 14 is a fifth structural diagram of a terminal provided by some embodiments of the present disclosure.

Optionally, referring to FIG. 14, before determining the path loss value corresponding to the resource in the uplink beam management resource set based on the path loss value of the transmission beam or the transmission beam pair of the Channel State Information Reference Signal (CSI-RS) set or the synchronization signal block set, the terminal 1000 further includes a second reception module 1004, or further includes a third reception module 1005 and a second determination module 1006. The second reception module 1004 is used to receive a CSI-RS set or a synchronization signal block set configured by a network device, wherein the CSI-RS set or the synchronization signal block set is used for calculating the path loss value of the resource in the uplink beam management resource set. Optionally, the third reception module 1005 is used to receive a measurement resource set configured by a network device; and the second determination module 1006 is used to determine a channel state information reference signal set or a synchronization signal block set used for calculating a path loss value of a resource in the uplink beam management resource set, according to a Reference Signal Receiving Power (RSRP) or a Signal to Interference Plus Noise Ratio (SINR) of a measurement resource in the measurement resource set.

Figure 15:
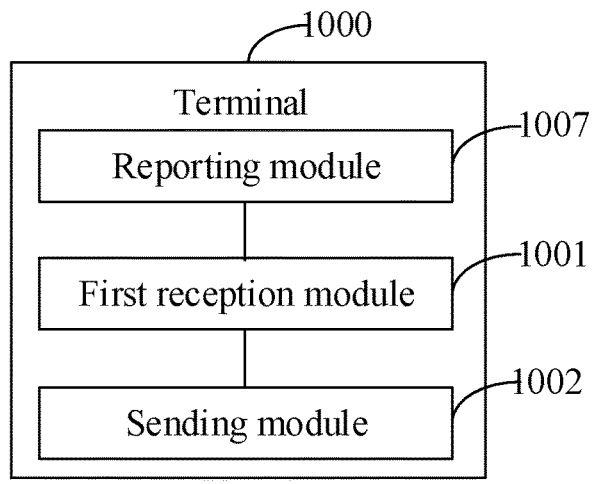
FIG. 15 is a sixth structural diagram of a terminal provided by some embodiments of the present disclosure.

Optionally, referring to FIG. 15, the terminal 1000 further includes a reporting module 1007. The reporting module 1007 is used to report a Reference Signal Receiving Power (RSRP) based on a periodic or semi-persistent channel state information reference signals (CSI-RSs) or periodic or semi-persistent synchronization signal blocks.

Optionally, the power control parameters corresponding to the resources in the uplink beam management resource sets used for different uplink beam management procedures are different; the power control parameters corresponding to non-quasi-colocation resource subsets of the uplink beam management resource set used for the uplink beam management procedure are different.

The terminal 1000 can implement each process executed by the terminal in any of the above method embodiments, and achieve the same or similar effect. To avoid repetition, detailed description thereof will not be described herein.

The terminal 1000 according to some embodiments of the present disclosure receives a power control parameter corresponding to a resource in an uplink beam management resource set through a first reception module 1001; sends a resource in the uplink beam management resource set according to a power control parameter corresponding to the resource in the uplink beam management resource set through the sending module 1002. Power control of resources in the uplink beam management resource set used for the uplink beam management procedure is realized, and a signaling overhead of the power control of a resource of the uplink beam management resource set used for the uplink beam management procedure can be controlled.

The embodiments of the present disclosure further provide a network device including a storage, a processor, and a computer program stored on the storage and executable by the processor, wherein, when the computer program is executed by the processor, the processor implements the steps of the power control method according to the method embodiment of FIG. 2, and the same or similar technical effects can be achieved. To avoid repetition, the detailed description thereof is omitted here.

The embodiments of the present disclosure further provide a terminal including a storage, a processor, and a computer program stored on the storage and executable by the processor, wherein, when the computer program is executed by the processor, the processor implements the steps of the power control method according to the method embodiment of FIG. 3, and the same or similar technical effects can be achieved. To avoid repetition, the detailed description thereof is omitted here.

The embodiments of the present disclosure further provide a computer readable storage medium having stored thereon a computer program, wherein when the computer program is executed by a processor, the processor implements the steps of the power control method according to the method embodiment of FIG. 2, and the same or similar technical effects can be achieved. To avoid repetition, the detailed description thereof is omitted here.

The embodiments of the present disclosure further provide a computer readable storage medium having stored thereon a computer program, wherein when the computer program is executed by a processor, the processor implements the steps of the power control method according to the method embodiment of FIG. 3, and the same or similar technical effects can be achieved. To avoid repetition, the detailed description thereof is omitted here.

Figure 16:
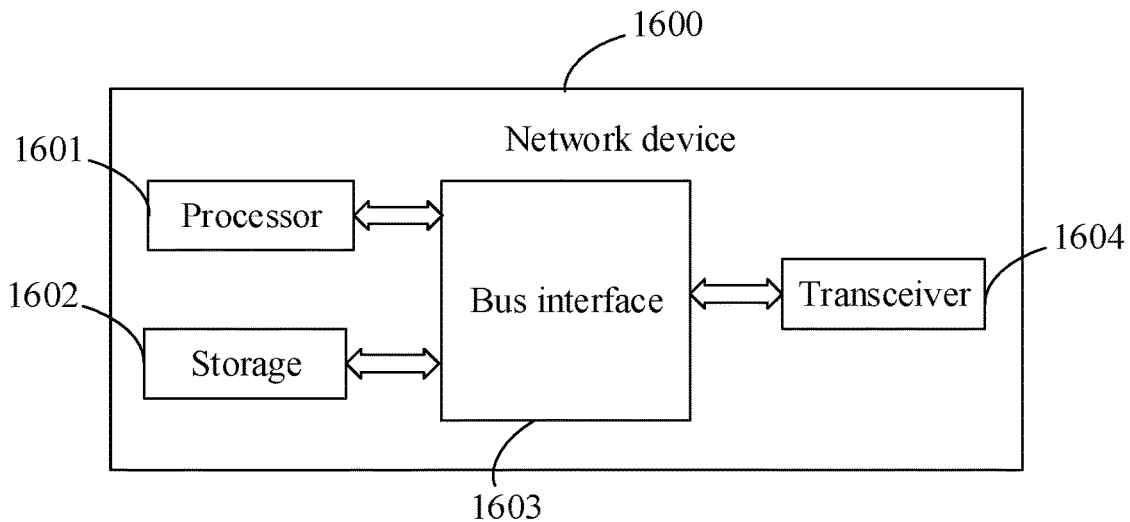
FIG. 16 is a third structural diagram of a network device provided by some embodiments of the present disclosure.

Referring to FIG. 16, FIG. 16 is a structural diagram of a network device provided by some embodiments of the present disclosure. As shown in FIG. 16, the network device 1600 includes a processor 1601, a storage 1602, a bus interface 1603, and a transceiver 1604, wherein the processor 1601, the storage 1602, and the transceiver 1604 are all connected to the bus interface 1603.

Here, in some embodiments of the present disclosure, the network device 1600 further includes a computer program store on the storage 1602 and executable by the processor 1601, and when the computer program is executed by the processor 1601, the processor 1601 implements follow steps: configuring a power control parameter for a resource in an uplink beam management resource set used for an uplink beam management procedure; and sending the power control parameter to a terminal, so that the terminal sends the resource in the uplink beam management resource set according to the power control parameter.

Optionally, the uplink beam management resource set includes one or more of a Sounding Reference Signal (SRS) resource set, a Physical Random Access Channel (PRACH) resource set, and a Physical Uplink Control Channel (PUCCH) resource set, wherein each of one or more of the SRS resource set, the PRACH resource set, and the PUCCH resource set may include resources corresponding to the same resource identifier and/or resources corresponding to different resource identifiers.

The power control parameter includes one or more of an open-loop power control parameter set, a closed-loop power control parameter set, a transmission power, a path loss value and a reference beam set identifier.

Optionally, the open-loop power control parameter set includes one or more of a target reception power, a path loss compensation factor, and a power offset; the closed-loop power control parameter set includes one or more of a power adjustment value, the number of resource blocks, and a modulation and coding scheme.

Optionally, when the computer program is executed by the processor 1601, the processor 1601 further implements following steps: configuring the common power control parameter for resources in the uplink beam management resource set used for the uplink beam management procedure; or configuring a corresponding power control parameter for each resource in the uplink beam management resource set used for the uplink beam management procedure, respectively, wherein corresponding power control parameters for respective resources are the same.

Optionally, the open-loop power control parameter set and/or the closed-loop power control parameter set are determined by a downlink beam or a downlink beam pair used to calculate a path loss value of a resource in the uplink beam management resource set, or, determined by an uplink beam or an uplink beam pair corresponding to the downlink beam or the downlink beam pair used to calculate a path loss value of a resource in the uplink beam management resource set; or the open-loop power control parameter set and/or the closed-loop power control parameter set are determined based on a reference power control parameter, wherein, the reference power control parameter includes a power control parameter of a Physical Uplink Shared Channel (PUSCH) or a power control parameter of a Physical Random Access Channel (PRACH) or a power control parameter of a Physical Uplink Control Channel (PUCCH) or a power control parameter of a Sounding Reference Signal (SRS); and/or the path loss value is calculated from one or more Reference Signal Receiving Power (RSRP) values reported by the terminal based on a channel state information reference signal (CSI-RS) set and/or a synchronization signal block set; and/or the reference beam set identifier is determined based on a beam reported by a terminal.

Optionally, when the computer program is executed by the processor 1601, the processor 1601 further implements the following steps: configuring a part of power control parameters in the open-loop power control parameter set and/or a part of power control parameters in the closed-loop power control parameter set for resources in the uplink beam management resource set used for the uplink beam management procedure.

Optionally, when the computer program is executed by the processor 1601, the processor 1601 further implements the following steps: configuring a channel state information reference signal (CSI-RS) set or a synchronization signal block set for calculating a path loss value of a resource in the uplink beam management resource set, and sending the CSI-RS set or the synchronization signal block set to a terminal; or configuring a measurement resource set and send the measurement resource set to a terminal.

Optionally, when the computer program is executed by the processor 1601, the processor 1601 further implements the following steps: receiving a Reference Signal Receiving Power (RSRP) reported by the terminal based on periodic or semi-persistent channel state information reference signals or synchronization signal blocks; and calculating the transmission power according to the RSRP.

Optionally, when the computer program is executed by the processor 1601, the processor 1601 further implements the following steps: configuring different power control parameters for resources in uplink beam management resource sets used for different uplink beam management procedures; configuring different power control parameters for resources in non-quasi-colocation resource subsets of an uplink beam management resource set used for one uplink beam management procedure.

A network device according to some embodiments of the present disclosure configures a power control parameter for a resource in an uplink beam management resource set used for an uplink beam management procedure, and sends the power control parameter to a terminal, so that the terminal sends the resource in the uplink beam management resource set according to the power control parameter. The power control of resources in the uplink beam management resource set used for the uplink beam management procedure is realized, and a signaling overhead of the power control of an uplink beam management resource used for the uplink beam management procedure can be controlled.

Figure 17:
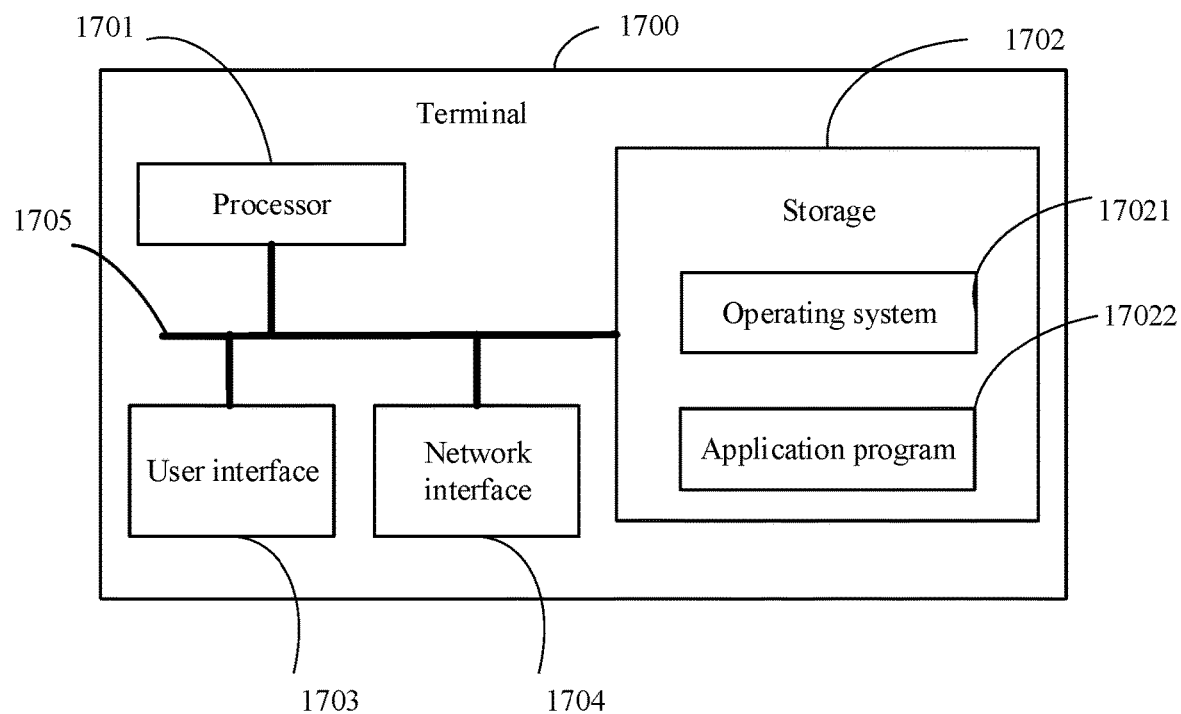
FIG. 17 is a seventh structural diagram of a terminal provided by some embodiments of the present disclosure.

Referring to FIG. 17, FIG. 17 is a structural diagram of a terminal provided by some embodiments of the present disclosure. As shown in FIG. 17, the terminal 1700 includes at least one processor 1701, a storage 1702, at least one network interface 1704 and a user interface 1703. Various components in the terminal 1700 are coupled together by a bus system 1705. It may be understood that the bus system 1705 is used to enable connection communication between these components. The bus system 1705 includes a data bus, a power bus, a control bus, and a status signal bus. However, for clarity of illustration, the various buses are designated as the bus system 1705 in FIG. 17.

The user interface 1703 may include a display, a keyboard, or a pointing device (e.g., a mouse, a trackball, a touch pad, or a touch screen, etc.).

It may be understood that the storage 1702 in the embodiments of the present disclosure may be a volatile storage or a non-volatile storage, or may include both volatile and non-volatile storages. The nonvolatile storage may be a Read-Only Memory (ROM), a Programmable ROM (PROM), an Erasable PROM (EPROM), an Electrically EPROM (EEPROM), or a flash memory. The volatile storage may be a Random Access Memory (RAM), which serves as an external cache. By way of example, but not limitation, many forms of RAMs may be used, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 1702 in a system and a method described herein is intended to include, but is not limited to, these and any other suitable types of storages.

In some embodiments, the storage 1702 stores following elements, executable modules or data structures, or a subset thereof, or an extension set thereof: an operating system 17021 and an application program 17022.

The operating system 17021 includes various system programs, such as a framework layer, a core library layer, and a driver layer, for implementing various basic services and processing hardware-based tasks. The application 17022 includes various application programs, such as a Media Player, a Browser, and the like, for implementing various application services. Programs implementing the methods of the embodiments of the present disclosure may be included in the application program 17022.

In some embodiments of the present disclosure, the terminal 1700 further includes a computer program stored on storage 1702 and executable by the processor 1701, wherein the computer program in particular may be a computer program in the application program 17022. When the computer program is executed by the processor 1701, the processor 1701 implements the following steps: receiving a power control parameter corresponding to a resource in an uplink beam management resource set used for an uplink beam management procedure; and sending the resource in the uplink beam management resource set according to the power control parameter corresponding to the resource in the uplink beam management resource set.

The methods disclosed by the embodiments of the present disclosure described above may be applied to, or implemented by, the processor 1701. The processor 1701 may be an integrated circuit chip with signal processing capability. In implementation, the steps of the method described above may be accomplished by integrated logic circuitry of hardware in the processor 1701 or instructions in the form of software. The processor 1701 may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The disclosed methods, steps, and logic blocks in the embodiments of the present disclosure may be implemented or performed. The general-purpose processor may be a microprocessor or the processor may be any conventional processor or the like. The steps of the method disclosed in connection with the embodiments of the present disclosure may be implemented directly as execution by a hardware decoding processor, or as a combination of hardware and software modules in the decoding processor. A software module may be located in a storage medium mature in the art such as a Random Access Memory, a flash memory, a Read Only Memory, a Programmable ROM, or an electrically erasable programmable memory, a register, etc. The storage medium is located in the storage 1702, and the processor 1701 reads information in the storage 1702 and performs the steps of the method described above in conjunction with hardware of the processor.

It may be understood that the embodiments described herein may be implemented by hardware, software, firmware, middleware, a microcode, or a combination thereof. For a hardware implementation, a processing unit may be implemented in one or more Application Specific Integrated Circuits (ASICs), a Digital Signal Processor (DSP), a Digital Signal Processing Device (DSP Device, DSPD), a Programmable Logic Device (PLD), an Field-Programmable Gate Array (FPGA), a general-purpose processor, a controller, a microcontroller, a microprocessor, other electronic units for performing the functions described herein, or a combination thereof.

For a software implementation, techniques described herein may be implemented by modules (e.g., processes, functions, etc.) that perform the functions described herein. A software code may be stored in a storage and executed by a processor. The storage may be implemented in the processor or external to the processor.

Optionally, the uplink beam management resource set includes one or more of a Sounding Reference Signal (SRS) resource set, a Physical Random Access Channel (PRACH) resource set, and a Physical Uplink Control Channel (PUCCH) resource set, wherein each of one or more of the SRS resource set, the PRACH resource set, and the PUCCH resource set may include resources corresponding to the same resource identifier and/or resources corresponding to different resource identifiers.

The power control parameter includes one or more of an open-loop power control parameter set, a closed-loop power control parameter set, a transmission power, a path loss value and a reference beam set identifier.

Optionally, the open-loop power control parameter set includes one or more of a target reception power, a path loss compensation factor, and a power offset; the closed-loop power control parameter set includes one or more of a power adjustment value, the number of resource blocks, and a modulation and coding scheme.

Optionally, power control parameters corresponding to respective resources in the uplink beam measurement resource set used for the same uplink beam measurement procedure are the same.

Optionally, when the computer program is executed by the processor 1701, the processor 1701 further implements the following steps: calculating a transmission power corresponding to the resource in the uplink beam management resource set, according to the power control parameter corresponding to the resource in the uplink beam management resource set, wherein, the power control parameter includes one or more of an open-loop power control parameter set, a closed-loop power control parameter set, a path loss value, and a reference beam set identifier; and sending the resource in the uplink beam management resource set using the transmission power corresponding to the resource in the uplink beam management resource set.

Optionally, in a case that the power control parameter includes the open-loop power control parameter set and/or the closed-loop power control parameter set, the processor 1701 further implements the following steps when the computer program is executed by the processor 1701: obtaining a reference power control parameter, wherein, the reference power control parameter includes a power control parameter of a Physical Uplink Shared Channel (PUSCH) or a power control parameter of a Physical Random Access Channel (PRACH) or a power control parameter of a Physical Uplink Control Channel (PUCCH) or a power control parameter of a Sounding Reference Signal (SRS); determining the transmission power corresponding to the resource in the uplink beam management resource set according to a part of power control parameters in the open-loop power control parameter set and/or a part of power control parameters in the closed-loop power control parameter set corresponding to resources in the uplink beam management resource set and according to the reference power control parameter; sending the resource in the uplink beam management resource set using the transmission power corresponding to the resource in the uplink beam management resource set.

Optionally, when the computer program is executed by the processor 1701, the processor 1701 further implements the following steps: obtaining a power control parameter of a current or historical PUSCH, or a power control parameter of a current or historical PRACH, or a power control parameter of a current or historical PUCCH, or a power control parameter of a current or historical Sounding Reference Signal (SRS) as the reference power control parameter.

Optionally, the reference power control parameter is determined by a beam or a beam pair corresponding to a path loss value of a resource in the uplink beam management resource set, or, determined by a beam or a beam pair corresponding to one path loss value of path loss values of transmission beams or transmission beam pairs of at least two Channel State Information Reference Signal (CSI-RS) sets or at least two synchronization signal block sets, wherein an absolute value of a difference value between the one path loss value and the path loss value of the resource in the uplink beam management resource set is minimum among absolute values of difference values between the path loss values and the path loss value of the resource in the uplink beam management resource set.

Optionally, when the computer program is executed by the processor 1701, the processor 1701 further implements the following steps: determining a path loss value corresponding to the resource in the uplink beam management resource set based on a path loss value of a transmission beam or a transmission beam pair of a Channel State Information Reference Signal (CSI-RS) set or a synchronization signal block set.

Optionally, when the computer program is executed by the processor 1701, the processor 1701 further implements the following steps: determining a maximum value of path loss values of transmission beams or transmission beam pairs of at least two CSI-RSs and/or at least two synchronization signal blocks as the path loss value corresponding to the resource in the uplink beam management resource set; or determining a minimum value of the path loss values of transmission beams or transmission beam pairs of at least two CSI-RSs and/or at least two synchronization signal blocks as the path loss value corresponding to the resource in the uplink beam management resource set; or determining an intermediate value among the path loss values of transmission beams or transmission beam pairs of at least two CSI-RSs and/or at least two synchronization signal blocks as the path loss value corresponding to the resource in the uplink beam management resource set; or determining a weighted average value of the path loss values of transmission beams or transmission beam pairs of at least two CSI-RSs and/or at least two synchronization signal blocks as the path loss value corresponding to the resource in the uplink beam management resource set.

Optionally, when the computer program is executed by the processor 1701, the processor 1701 further implements the following steps: receiving a CSI-RS set or a synchronization signal block set configured by a network device, wherein the CSI-RS set or the synchronization signal block set is used for calculating the path loss value of the resource in the uplink beam management resource set; or when the computer program is executed by the processor 1701, the processor 1701 further implements the following steps: receiving a measurement resource set configured by a network device, determining a channel state information reference signal set or a synchronization signal block set used for calculating a path loss value of a resource in the uplink beam management resource set, according to a Reference Signal Receiving Power (RSRP) or a Signal to Interference Plus Noise Ratio (SINR) of a measurement resource in the measurement resource set.

Optionally, when the computer program is executed by the processor 1701, the processor 1701 further implements the following steps: reporting a Reference Signal Receiving Power (RSRP) based on periodic or semi-persistent channel state information reference signals (CSI-RSs) or periodic or semi-persistent synchronization signal blocks.

Optionally, the power control parameters corresponding to the resources in the uplink beam management resource sets used for different uplink beam management procedures are different; the power control parameters corresponding to non-quasi-colocation resource subsets of the uplink beam management resource set used for one uplink beam management procedure are different.

The terminal 1700 can implement various processes implemented by the terminal in the foregoing embodiments, and in order to avoid repetition, the detailed description thereof is omitted here.

The terminal 1700 according to some embodiments of the present disclosure receives a power control parameter corresponding to a resource in an uplink beam management resource set; sends a resource in the uplink beam management resource set according to a power control parameter corresponding to the resource in the uplink beam management resource set. Power control of resources in the uplink beam management resource set used for the uplink beam management procedure is realized, and a signaling overhead of the power control of an uplink beam management resource used for the uplink beam management procedure can be controlled.

Those of ordinary skills in the art will appreciate that elements and algorithm steps of examples described in connection with the embodiments disclosed herein can be implemented in electronic hardware, or a combination of computer software and electronic hardware. Whether these functions are performed in the form of hardware or software depends on a specific application and design constraints of a technical solution. Those skilled in the art may use different methods to implement the described functions for each particular application, but such implementation should not be considered to go beyond the scope of the present disclosure.

It can be clearly understood by those skilled in the art that, for convenience and brevity of description, specific working processes of the systems, devices and units described above can be obtained by referring to corresponding processes in the method embodiments described above, and will not be described again herein.

In the embodiments provided herein, it should be understood that the disclosed devices and methods may be implemented in other ways. For example, the device embodiments described above are merely illustrative. For example, division of units is only logical function division, may be implemented in another division manner, For example, multiple units or components may be combined or integrated into another system, or some features may be ignored, or not performed. Optionally, a coupling or a direct coupling or a communication connection shown or discussed between one and another may be an indirect coupling or communication connection through some interfaces, devices or units, may be in an electrical, mechanical or other form.

Elements described as separate elements may or may not be physically separate. Components shown as elements may or may not be physical elements, i.e. may be located in one place, or may also be distributed over a plurality of network elements. Some or all of the elements may be selected according to actual needs to achieve objectives of the embodiments of the present disclosure.

In addition, functional units in various embodiments of the present disclosure may be integrated in one process unit, may be distributed in separated physical units, or two or more of the functional units may be integrated in one unit.

The functions may be stored in a computer readable storage medium in a case that the functions are implemented in the form of software functional units and sold or used as separate products. Based on such an understanding, essential parts of technical solutions of the present disclosure, or a part of the technical solutions contributing to the related art, or a part of the technical solutions may be embodied in the form of a software product, which is stored in a storage medium. The storage medium includes a number of instructions used to cause a computer device (which may be a personal computer, a server, or a network device, etc.) to perform all or part of steps of methods described in various embodiments of the present disclosure. The aforementioned storage medium includes various media capable of storing program codes such as a U disk, a removable hard disk, a ROM, a RAM, a magnetic disk, or an optical disk.

The above description is only related to specific embodiments of the present disclosure, but the protection scope of the present disclosure is not limited thereto. Changes or substitutions easily thought of by any person skilled in the art within a technical scope of the present disclosure, are intended to be included within the protection scope of the present disclosure. Accordingly, the protection scope of the present disclosure shall be consistent with the protection scope of the claims.

What is claimed is:

1. A power control method for a terminal, the power control method comprising:

receiving a power control parameter corresponding to a resource in an uplink beam management resource set used for an uplink beam management procedure; and sending the resource in the uplink beam management resource set according to the power control parameter corresponding to the resource in the uplink beam management resource set;

wherein, the power control parameter comprises a reference beam set identifier, the reference beam set identifier is used to indicate Channel State Information Reference Signal (CSI-RS) sets or synchronization signal block sets;

sending the resource in the uplink beam management resource set according to the power control parameter corresponding to the resource in the uplink beam management resource set comprises:

determining a path loss value corresponding to the resource in the uplink beam management resource set based on the Channel State Information Reference Signal (CSI-RS) sets or the synchronization signal block sets;

sending the resource in the uplink beam management resource set according to the path loss value.

2. The method according to claim 1, wherein, the uplink beam management resource set comprises one or more of a Sounding Reference Signal (SRS) resource set, a Physical Random Access Channel (PRACH) resource set, and a Physical Uplink Control Channel (PUCCH) resource set, wherein each of one or more of the SRS resource set, the PRACH resource set, and the PUCCH resource set comprises resources corresponding to a same resource identifier and/or resources corresponding to different resource identifiers; and the power control parameter further comprises one or more of an open-loop power control parameter set, a closed-loop power control parameter set, a transmission power, a path loss value.

3. The method according to claim 2, wherein,
the open-loop power control parameter set comprises one or more of a target reception power, a path loss compensation factor, and a power offset; and
the closed-loop power control parameter set comprises one or more of a power adjustment value, the number of resource blocks, and a modulation and coding scheme.

4. The method according to claim 1, wherein power control parameters corresponding to respective resources in the uplink beam measurement resource set used for a same uplink beam measurement procedure are same.

5. The method according to claim 2, wherein sending the resource in the uplink beam management resource set according to the power control parameter corresponding to the resource in the uplink beam management resource set further comprises:
calculating a transmission power corresponding to the resource in the uplink beam management resource set, according to the power control parameter corresponding to the resource in the uplink beam management resource set, wherein, the power control parameter comprises one or more of an open-loop power control parameter set, a closed-loop power control parameter set, and a path loss value; and
sending the resource in the uplink beam management resource set using the transmission power corresponding to the resource in the uplink beam management resource set.

6. The method according to claim 2, wherein in a case that the power control parameter comprises the open-loop power control parameter set and/or the closed-loop power control parameter set, sending the resource in the uplink beam management resource set according to the power control parameter corresponding to the resource in the uplink beam management resource set comprises:
obtaining a reference power control parameter, wherein, the reference power control parameter comprises a power control parameter of a Physical Uplink Shared Channel (PUSCH) or a power control parameter of a Physical Random Access Channel (PRACH) or a power control parameter of a Physical Uplink Control Channel (PUCCH) or a power control parameter of a Sounding Reference Signal (SRS);
determining a transmission power corresponding to the resource in the uplink beam management resource set according to a part of power control parameters in the open-loop power control parameter set and/or a part of power control parameters in the closed-loop power control parameter set corresponding to resources in the uplink beam management resource set and according to the reference power control parameter; and
sending the resource in the uplink beam management resource set using the transmission power corresponding to the resource in the uplink beam management resource set.

7. The method according to claim 6, wherein obtaining the reference power control parameter comprises:
obtaining a power control parameter of a current or historical PUSCH, or a power control parameter of a current or historical PRACH, or a power control parameter of a current or historical PUCCH, or a power control parameter of a current or historical Sounding Reference Signal (SRS) as the reference power control parameter.

8. The method according to claim 6, wherein the reference power control parameter is determined by a beam or a beam pair corresponding to a path loss value of a resource in the uplink beam management resource set, or, determined by a beam or a beam pair corresponding to one path loss value of path loss values of transmission beams or transmission beam pairs of at least two Channel State Information Reference Signal (CSI-RS) sets or at least two synchronization signal block sets, wherein an absolute value of a difference value between the one path loss value and the path loss value of the resource in the uplink beam management resource set is minimum among absolute values of difference values between the path loss values and the path loss value of the resource in the uplink beam management resource set.

9. The method according to claim 1, wherein determining the path loss value corresponding to the resource in the uplink beam management resource set based on the path loss value of the transmission beam or the transmission beam pair of the CSI-RS set or the synchronization signal block set comprises:
determining a maximum value of path loss values of transmission beams or transmission beam pairs of at least two CSI-RSs and/or at least two synchronization signal blocks as the path loss value corresponding to the resource in the uplink beam management resource set; or
determining a minimum value of path loss values of transmission beams or transmission beam pairs of at least two CSI-RSs and/or at least two synchronization signal blocks as the path loss value corresponding to the resource in the uplink beam management resource set; or
determining an intermediate value among path loss values of transmission beams or transmission beam pairs of at least two CSI-RSs and/or at least two synchronization signal blocks as the path loss value corresponding to the resource in the uplink beam management resource set; or
determining a weighted average value of path loss values of transmission beams or transmission beam pairs of at least two CSI-RSs and/or at least two synchronization signal blocks as the path loss value corresponding to the resource in the uplink beam management resource set.

10. The method according to claim 1, wherein before determining the path loss value corresponding to the resource in the uplink beam management resource set based on the path loss value of the transmission beam or the transmission beam pair of the CSI-RS set or the synchronization signal block set, the method further comprises:
receiving the CSI-RS set or the synchronization signal block set configured by a network device, wherein the CSI-RS set or the synchronization signal block set is used for calculating the path loss value of the resource in the uplink beam management resource set; or,
receiving a measurement resource set configured by a network device, determining the CSI-RS set or the synchronization signal block set used for calculating a path loss value of a resource in the uplink beam management resource set, according to a Reference Signal Receiving Power (RSRP) or a Signal to Interference Plus Noise Ratio (SINR) of a measurement resource in the measurement resource set.

11. The method according to claim 1, wherein,
power control parameters corresponding to resources in uplink beam management resource sets used for different uplink beam management procedures are different; or
power control parameters corresponding to non-quasi-colocation resource subsets of the uplink beam management resource set used for one uplink beam management procedure are different.

12. A terminal, comprising:
a storage, a processor, and a computer program stored on the storage and executable by the processor, wherein, when the processor executes the computer program, the processor implements the follow steps:
receiving a power control parameter corresponding to a resource in an uplink beam management resource set used for an uplink beam management procedure; and
sending the resource in the uplink beam management resource set according to the power control parameter corresponding to the resource in the uplink beam management resource set;
wherein, the power control parameter comprises a reference beam set identifier, the reference beam set identifier is used to indicate Channel State Information Reference Signal (CSI-RS) sets or synchronization signal block sets;
sending the resource in the uplink beam management resource set according to the power control parameter corresponding to the resource in the uplink beam management resource set comprises:
determining a path loss value corresponding to the resource in the uplink beam management resource set based on the Channel State Information Reference Signal (CSI-RS) sets or the synchronization signal block sets;
sending the resource in the uplink beam management resource set according to the path loss value.

13. The terminal according to claim 12, wherein,
the uplink beam management resource set comprises one or more of a Sounding Reference Signal (SRS) resource set, a Physical Random Access Channel (PRACH) resource set, and a Physical Uplink Control Channel (PUCCH) resource set, wherein each of one or more of the SRS resource set, the PRACH resource set, and the PUCCH resource set comprises resources corresponding to a same resource identifier and/or resources corresponding to different resource identifiers; and
the power control parameter further comprises one or more of an open-loop power control parameter set, a closed-loop power control parameter set, a transmission power, a path loss value.

14. The terminal according to claim 13, wherein,
the open-loop power control parameter set comprises one or more of a target reception power, a path loss compensation factor, and a power offset; and
the closed-loop power control parameter set comprises one or more of a power adjustment value, the number of resource blocks, and a modulation and coding scheme.

15. The terminal according to claim 12, wherein power control parameters corresponding to respective resources in the uplink beam measurement resource set used for a same uplink beam measurement procedure are same.

16. The terminal according to claim 13, wherein sending the resource in the uplink beam management resource set according to the power control parameter corresponding to the resource in the uplink beam management resource set further comprises:
calculating a transmission power corresponding to the resource in the uplink beam management resource set, according to the power control parameter corresponding to the resource in the uplink beam management resource set, wherein, the power control parameter comprises one or more of an open-loop power control parameter set, a closed-loop power control parameter set, and a path loss value; and
sending the resource in the uplink beam management resource set using the transmission power corresponding to the resource in the uplink beam management resource set.

17. The terminal according to claim 13, wherein in a case that the power control parameter comprises the open-loop power control parameter set and/or the closed-loop power control parameter set, sending the resource in the uplink beam management resource set according to the power control parameter corresponding to the resource in the uplink beam management resource set comprises:
obtaining a reference power control parameter, wherein, the reference power control parameter comprises a power control parameter of a Physical Uplink Shared Channel (PUSCH) or a power control parameter of a Physical Random Access Channel (PRACH) or a power control parameter of a Physical Uplink Control Channel (PUCCH) or a power control parameter of a Sounding Reference Signal (SRS);
determining a transmission power corresponding to the resource in the uplink beam management resource set according to a part of power control parameters in the open-loop power control parameter set and/or a part of power control parameters in the closed-loop power control parameter set corresponding to resources in the uplink beam management resource set and according to the reference power control parameter; and
sending the resource in the uplink beam management resource set using the transmission power corresponding to the resource in the uplink beam management resource set.

18. The terminal according to claim 12, wherein determining the path loss value corresponding to the resource in the uplink beam management resource set based on the path loss value of the transmission beam or the transmission beam pair of the CSI-RS set or the synchronization signal block set comprises:
determining a maximum value of path loss values of transmission beams or transmission beam pairs of at least two CSI-RSs and/or at least two synchronization signal blocks as the path loss value corresponding to the resource in the uplink beam management resource set; or
determining a minimum value of path loss values of transmission beams or transmission beam pairs of at least two CSI-RSs and/or at least two synchronization signal blocks as the path loss value corresponding to the resource in the uplink beam management resource set; or
determining an intermediate value among path loss values of transmission beams or transmission beam pairs of at least two CSI-RSs and/or at least two synchronization signal blocks as the path loss value corresponding to the resource in the uplink beam management resource set; or determining a weighted average value of path loss values of transmission beams or transmission beam pairs of at least two CSI-RSs and/or at least two synchronization signal blocks as the path loss value corresponding to the resource in the uplink beam management resource set.

19. The terminal according to claim 12, wherein before determining the path loss value corresponding to the resource in the uplink beam management resource set based on the path loss value of the transmission beam or the transmission beam pair of the CSI-RS set or the synchronization signal block set, the method further comprises:
  receiving the CSI-RS set or the synchronization signal block set configured by a network device, wherein the CSI-RS set or the synchronization signal block set is used for calculating the path loss value of the resource in the uplink beam management resource set; or,
  receiving a measurement resource set configured by a network device, determining the CSI-RS set or the synchronization signal block set used for calculating a path loss value of a resource in the uplink beam management resource set, according to a Reference Signal Receiving Power (RSRP) or a Signal to Interference Plus Noise Ratio (SINR) of a measurement resource in the measurement resource set.

20. A non-transitory computer readable storage medium, wherein a computer program is stored on the computer readable storage medium, and when a processor executes the computer program, the processor implements the follow steps:
  receiving a power control parameter corresponding to a resource in an uplink beam management resource set used for an uplink beam management procedure; and
  sending the resource in the uplink beam management resource set according to the power control parameter corresponding to the resource in the uplink beam management resource set;
  wherein, the power control parameter comprises a reference beam set identifier, the reference beam set identifier is used to indicate Channel State Information Reference Signal (CSI-RS) sets or synchronization signal block sets;
  sending the resource in the uplink beam management resource set according to the power control parameter corresponding to the resource in the uplink beam management resource set comprises:
  determining a path loss value corresponding to the resource in the uplink beam management resource set based on the Channel State Information Reference Signal (CSI-RS) sets or the synchronization signal block sets;
  sending the resource in the uplink beam management resource set according to the path loss value.

* * * * *